(12) United States Patent
    Tabata

(10) Patent No.: US 10,247,079 B2
(45) Date of Patent: Apr. 2, 2019

(54) EXHAUST GAS PURIFICATION SYSTEM OF INTERNAL COMBUSTION ENGINE HAVING TURBOCHARGER

(71) Applicant: TOYOTA JIDOSHA KABUSHIKI KAISHA, Toyota-shi, Aichi-ken (JP)

(72) Inventor: Masakazu Tabata, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 106 days.

(21) Appl. No.: 15/128,535

(22) PCT Filed: Oct. 20, 2014

(86) PCT No.: PCT/JP2014/005314
§ 371 (c)(1),
(2) Date: Sep. 23, 2016

(87) PCT Pub. No.: WO2015/145498
PCT Pub. Date: Oct. 1, 2015

(65) Prior Publication Data
US 2017/0107885 A1    Apr. 20, 2017

(30) Foreign Application Priority Data
Mar. 25, 2014  (JP) .................................. 2014-061268

(51) Int. Cl.
*F01N 5/04*  (2006.01)
*F01N 3/28*  (2006.01)
(Continued)

(52) U.S. Cl.
CPC ........... *F01N 5/04* (2013.01); *B01D 46/2455* (2013.01); *B01D 53/94* (2013.01); *F01N 3/0217* (2013.01);
(Continued)

(58) Field of Classification Search
CPC ... F01N 5/04; F01N 3/10; F01N 3/105; F01N 3/2803; F01N 3/0217; F01N 2330/60;
(Continued)

(56) References Cited

U.S. PATENT DOCUMENTS

| 6,689,327 B1 * | 2/2004 | Reck ..................... F01N 3/2013 |
| | | 422/180 |
| 2004/0187456 A1 * | 9/2004 | Bruck .................. B01D 39/086 |
| | | 55/487 |

(Continued)

FOREIGN PATENT DOCUMENTS

| DE | 10 2005 061958 A1 | 7/2007 | |
| DE | 102012000591 A1 * | 7/2013 | ............. F01N 3/106 |

(Continued)

*Primary Examiner* — Jason Newton
(74) *Attorney, Agent, or Firm* — Hunton Andrews Kurth LLP

(57) ABSTRACT

The invention relates to an exhaust gas purification system applied to an internal combustion engine. The engine has a turbocharger including a turbine wheel and a housing for housing the turbine wheel. The housing defines a turbine outlet passage communicating with an exhaust gas discharging part of the turbine wheel. The engine further has an exhaust passage part communicating with an exhaust gas outlet of the turbine outlet passage. The system comprises an exhaust gas purification apparatus disposed in the exhaust passage part at a position adjacent to the exhaust gas outlet of the turbine outlet passage. Further, the apparatus includes an exhaust gas purification member. The member is provided such that its density in a peripheral part of the exhaust passage part is larger than that in a central part of the exhaust passage part and a flow passage resistance per unit volume of the member at an area of the central part of the exhaust passage part is smaller than that at an area of the peripheral part of the exhaust passage part.

4 Claims, 18 Drawing Sheets

(51) Int. Cl.
  *F01N 3/021*  (2006.01)
  *F01N 3/10*   (2006.01)
  *B01D 46/24*  (2006.01)
  *B01D 53/94*  (2006.01)
  *F02B 37/00*  (2006.01)

(52) U.S. Cl.
  CPC .............. *F01N 3/10* (2013.01); *F01N 3/105* (2013.01); *F01N 3/2803* (2013.01); *F02B 37/00* (2013.01); *B01D 2046/2492* (2013.01); *B01D 2275/20* (2013.01); *B01D 2277/10* (2013.01); *B01D 2279/30* (2013.01); *F01N 2330/32* (2013.01); *F01N 2330/60* (2013.01); *F01N 2340/06* (2013.01); *Y02T 10/144* (2013.01); *Y02T 10/20* (2013.01)

(58) Field of Classification Search
  CPC . F01N 2330/32; F01N 2340/06; B01D 53/94; B01D 46/2455; B01D 2277/10; B01D 2046/2492; B01D 2275/20; B01D 2279/30; F02B 37/00; Y02T 10/144; Y02T 10/20
  USPC ........................................................ 60/605.1
  See application file for complete search history.

(56) References Cited

U.S. PATENT DOCUMENTS

2011/0179770 A1* 7/2011 Schmuck-Soldan ........................ F01N 3/2053 60/273
2012/0186205 A1* 7/2012 Wieres .................... F01N 3/021 55/385.3
2012/0312011 A1* 12/2012 Romblom ............... F01D 9/026 60/605.1
2014/0004013 A1* 1/2014 Park ................... B01D 53/9477 422/171
2017/0107885 A1* 4/2017 Tabata ................. F01N 3/2803
2018/0135490 A1* 5/2018 Ricci .................... F01N 3/2053

FOREIGN PATENT DOCUMENTS

| | | | | |
|---|---|---|---|---|
| EP | 1099833 | A2 | 5/2001 | |
| EP | 2818640 | A2 * | 12/2014 | .............. F02B 37/18 |
| FR | 3053391 | A1 * | 1/2018 | ......... F01N 13/1805 |
| JP | H01-280612 | A | 11/1989 | |
| JP | H10-246109 | A | 9/1998 | |
| JP | H11-510872 | A | 9/1999 | |
| JP | 2001-050043 | A | 2/2001 | |
| JP | 2001-129407 | A | 5/2001 | |
| JP | 2005-069083 | A | 3/2005 | |
| JP | 2005-344580 | A | 12/2005 | |
| JP | 2006-328954 | A | 12/2006 | |
| JP | 2010-121521 | A | 6/2010 | |
| JP | WO 2011090189 | A1 * | 7/2011 | ............. F01N 3/106 |
| JP | WO 2011090190 | A1 * | 7/2011 | ......... B01D 53/9477 |
| JP | 2012-036840 | A | 2/2012 | |
| JP | 2013-509519 | A | 3/2013 | |
| JP | 2013-238241 | A | 11/2013 | |
| JP | WO 2015145498 | A1 * | 10/2015 | ........... F01N 3/2803 |
| WO | WO 2007079833 | A1 * | 7/2007 | ........... F01N 3/0211 |
| WO | 2011/029705 | A1 | 3/2011 | |

* cited by examiner

[Fig. 1]
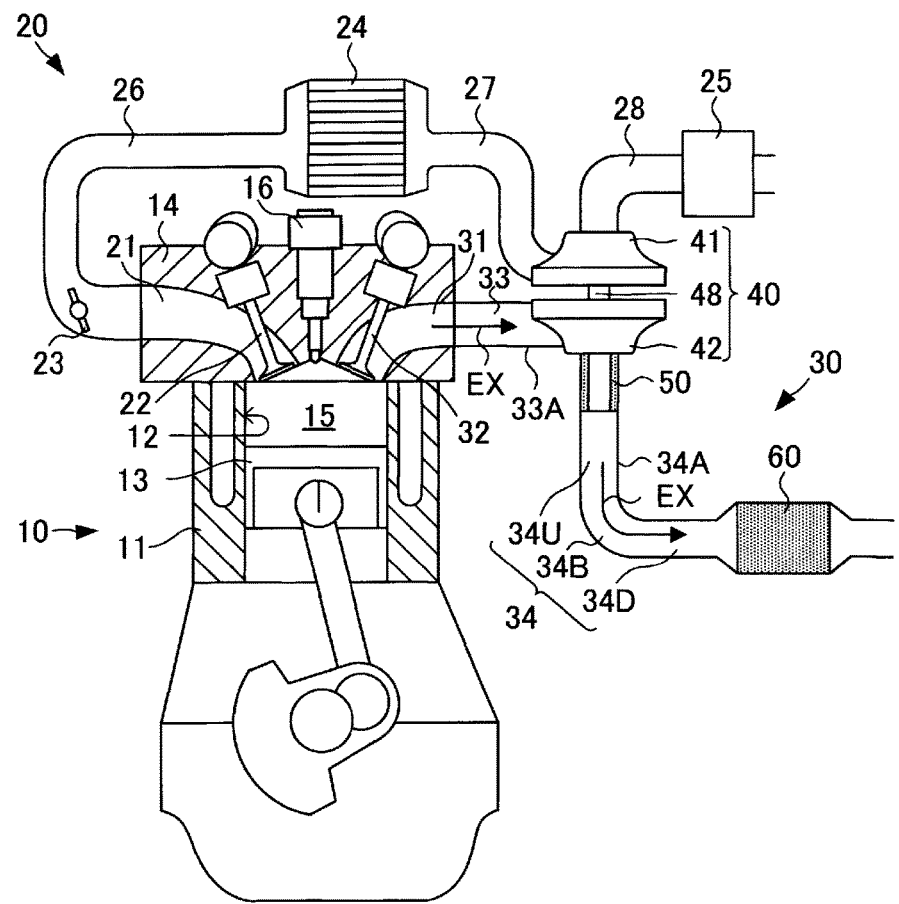

[Fig. 2]
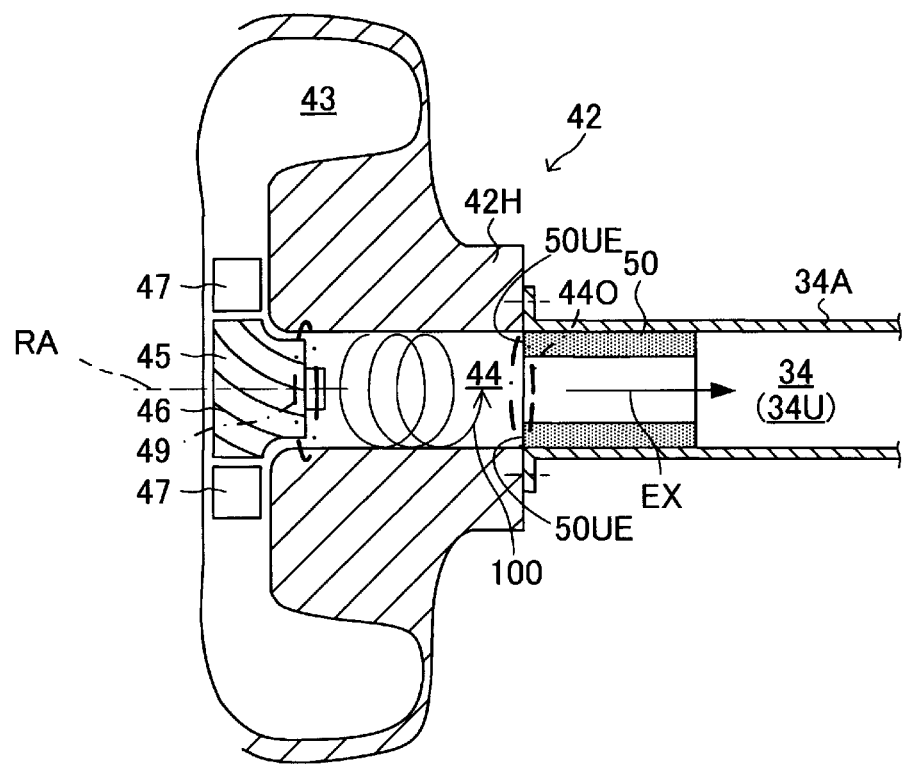

[Fig. 3]
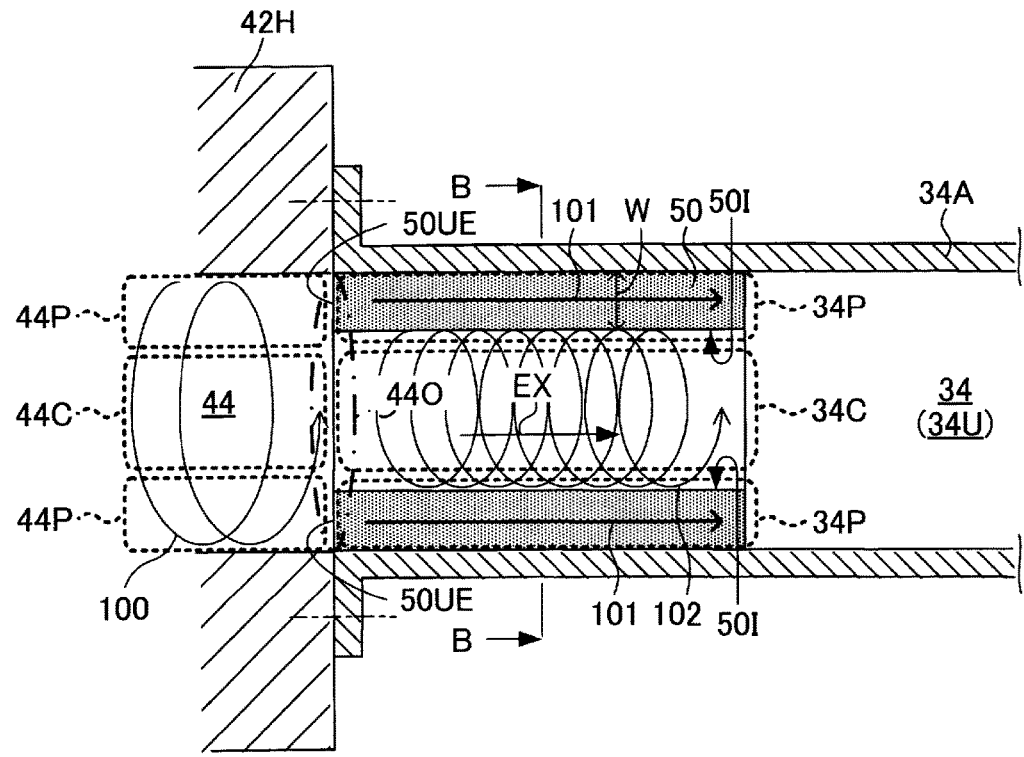
(A)
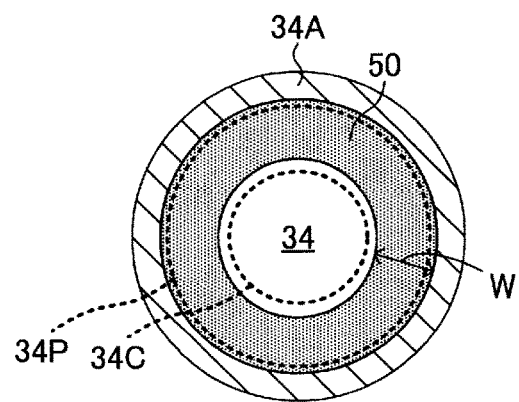
(B)

[Fig. 4]
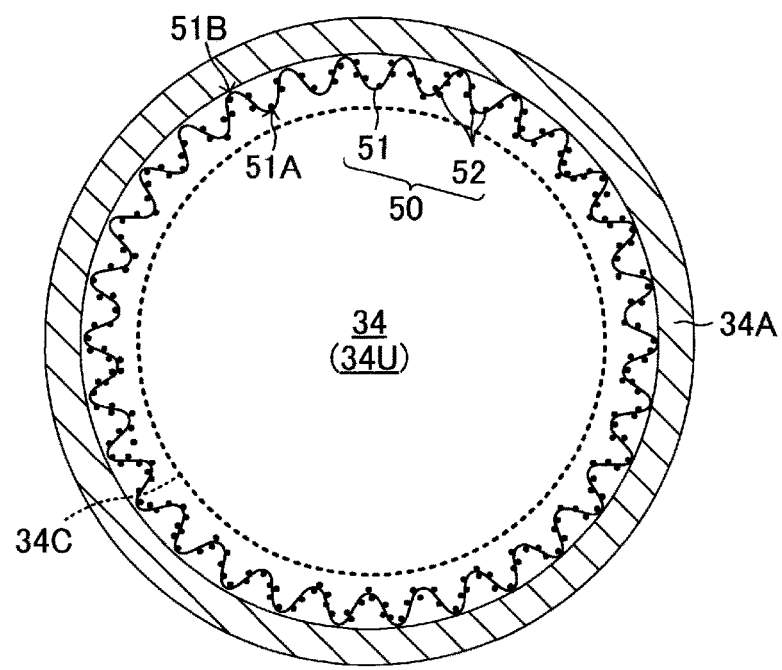

[Fig. 5]
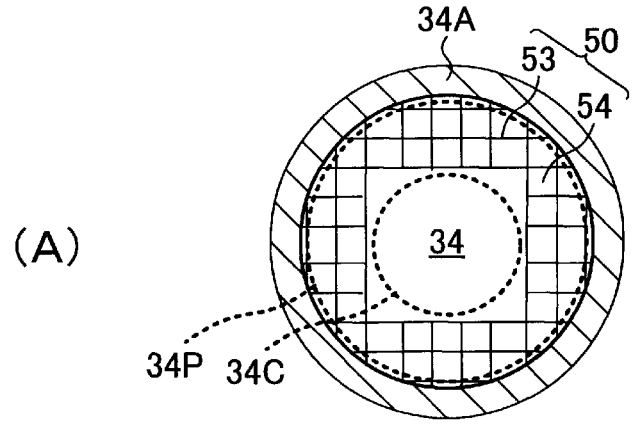
(A)
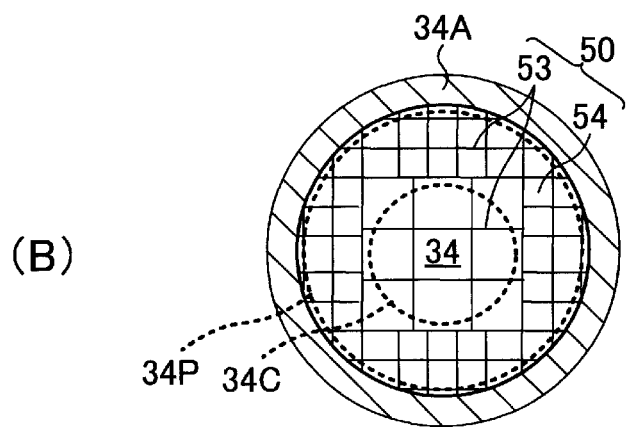
(B)
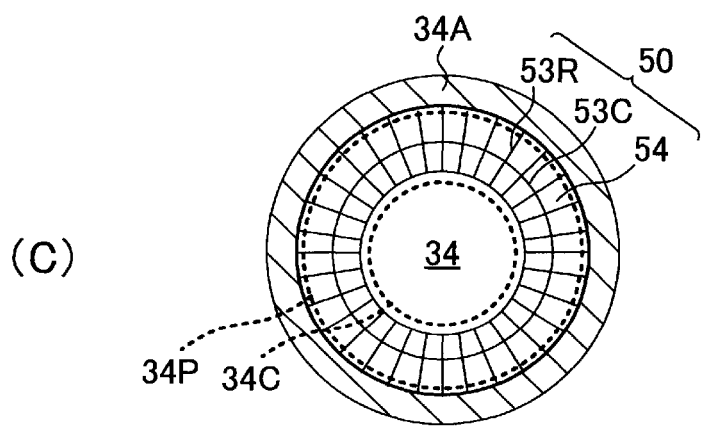
(C)

[Fig. 6]
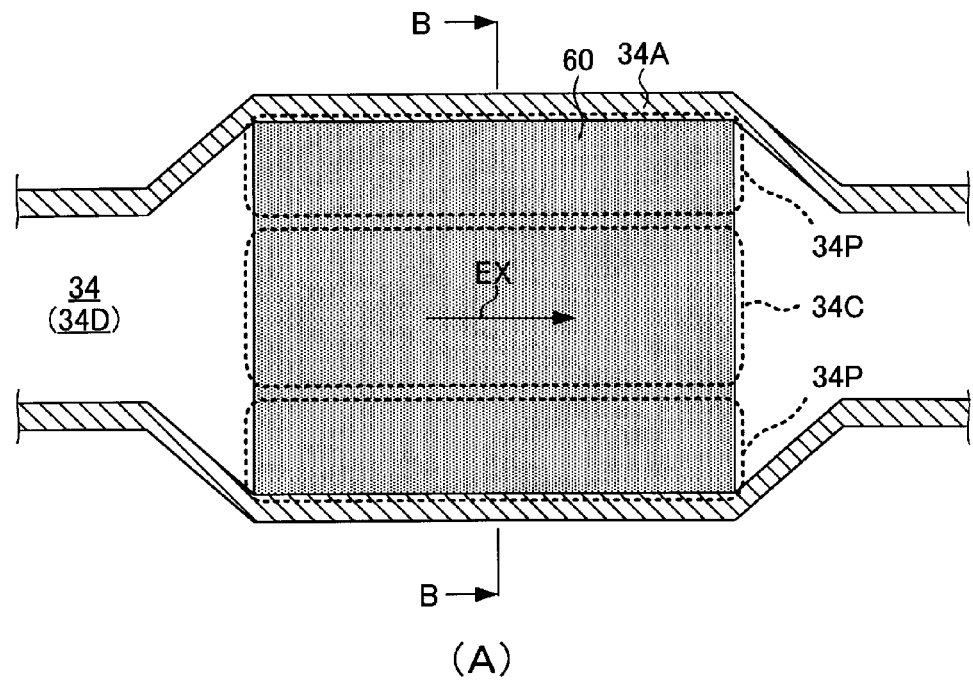
(A)
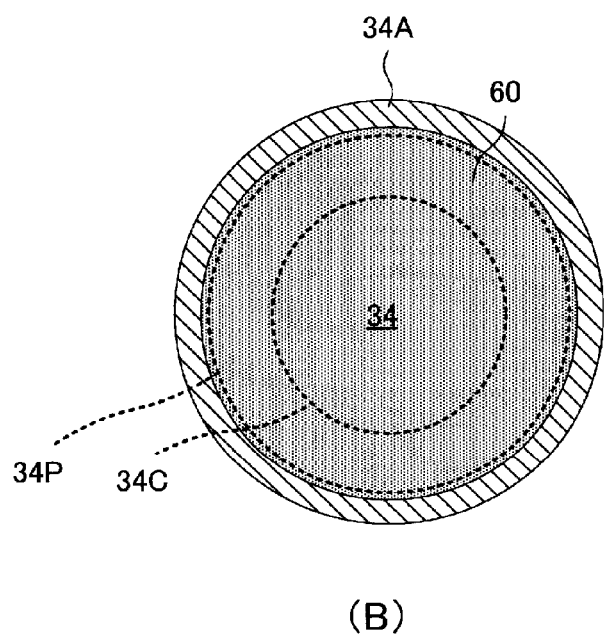
(B)

[Fig. 7]
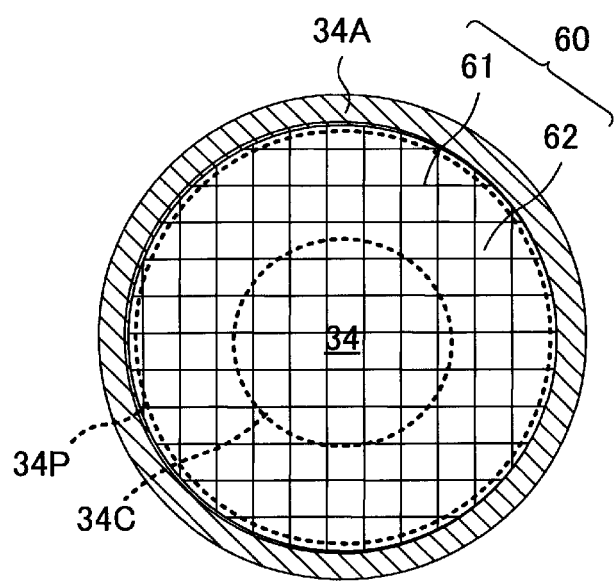

[Fig. 8]
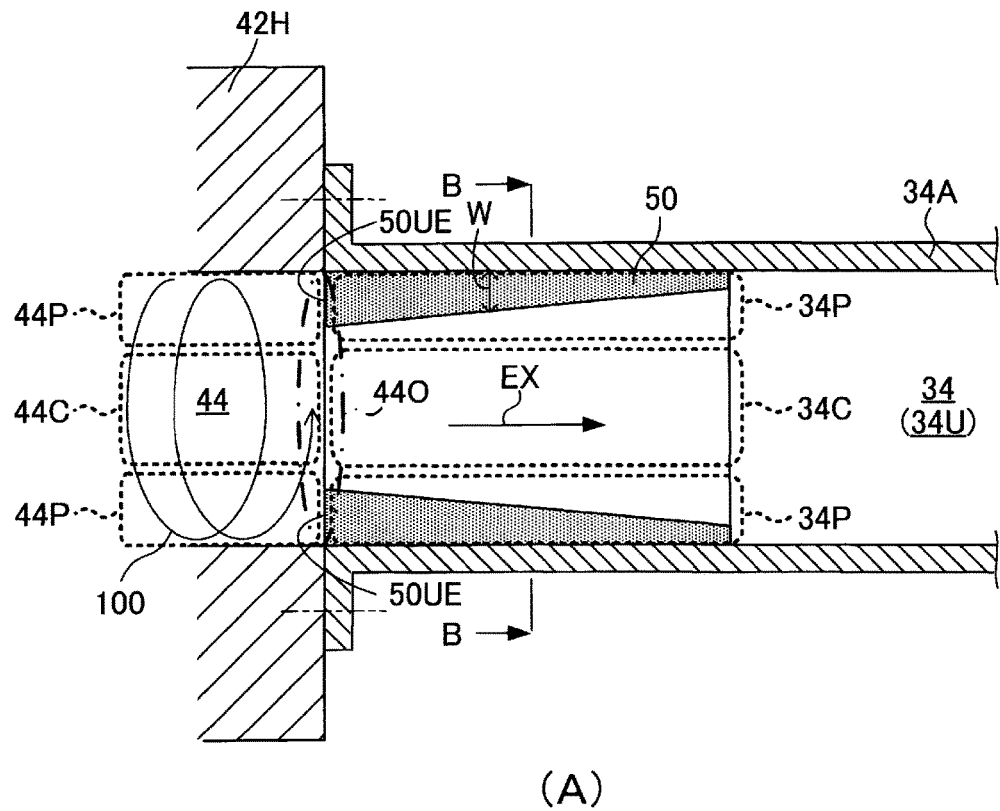
(A)
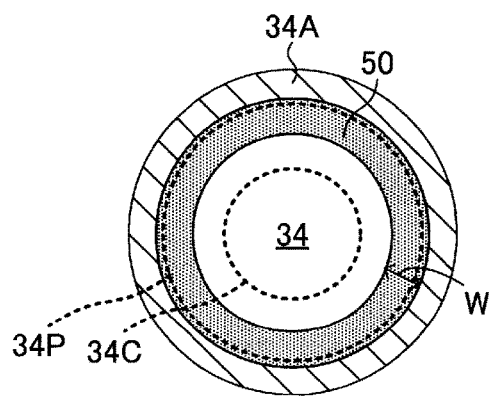
(B)

[Fig. 9]
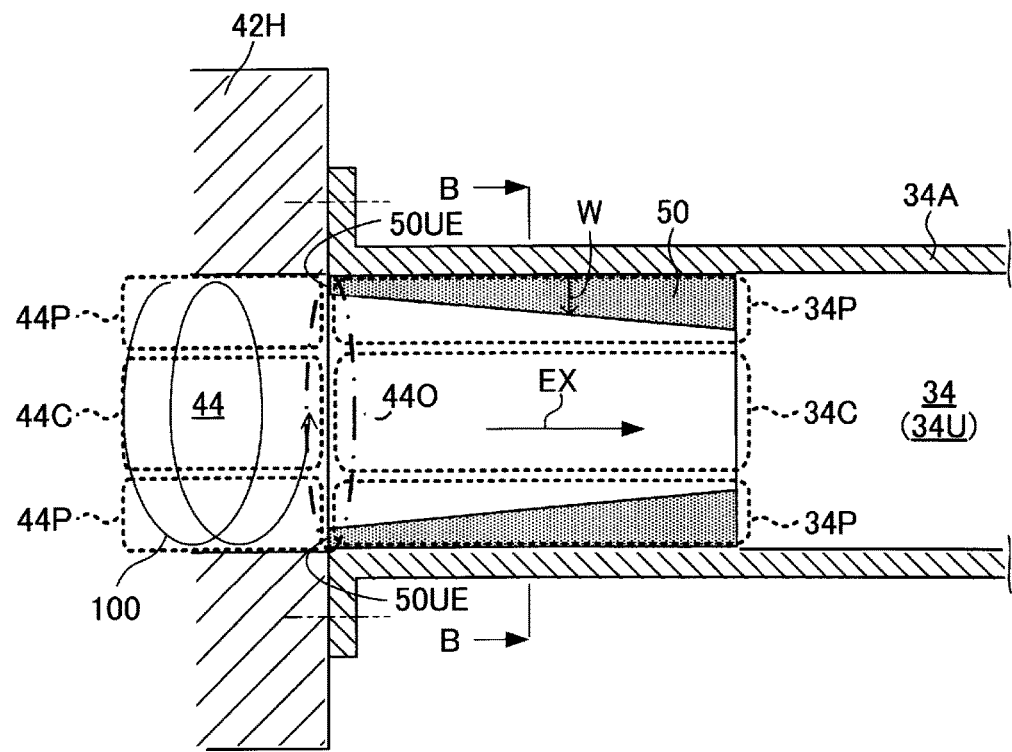
(A)
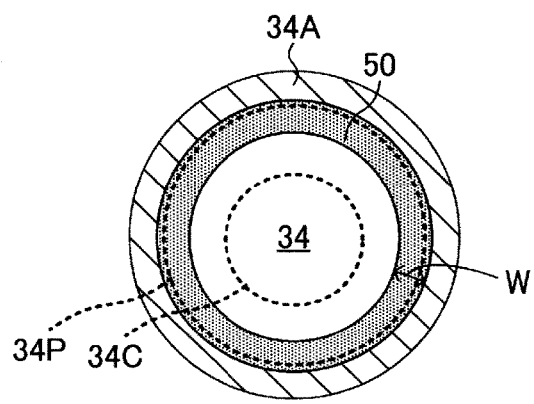
(B)

[Fig. 10]
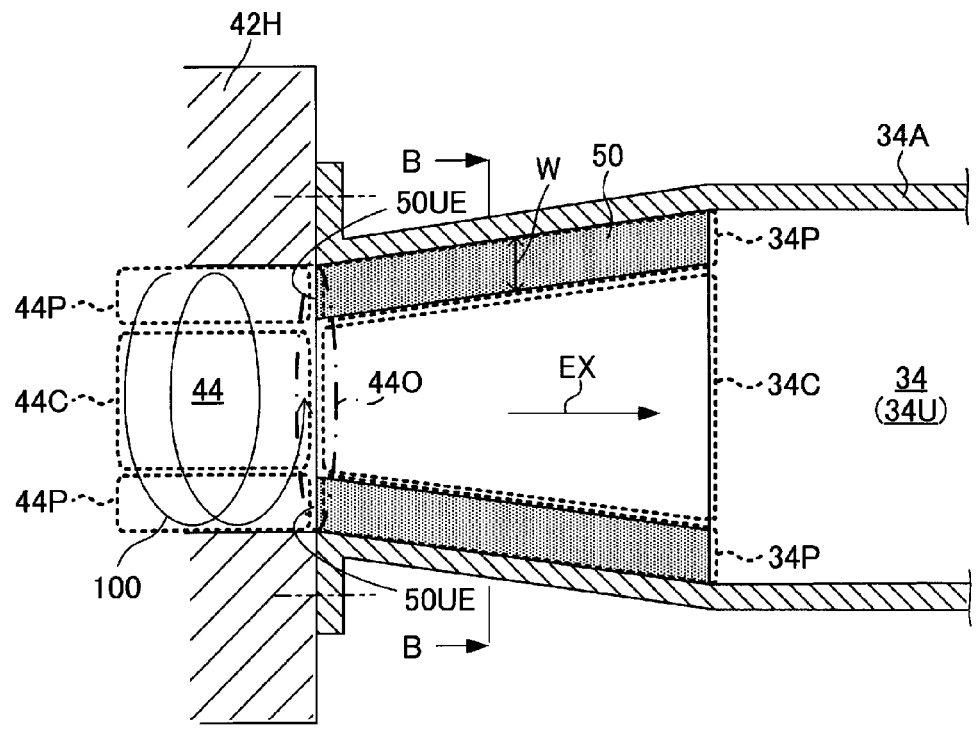
(A)
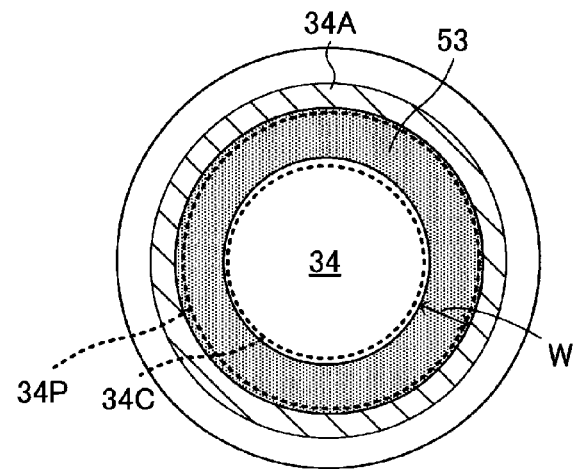
(B)

[Fig. 11]
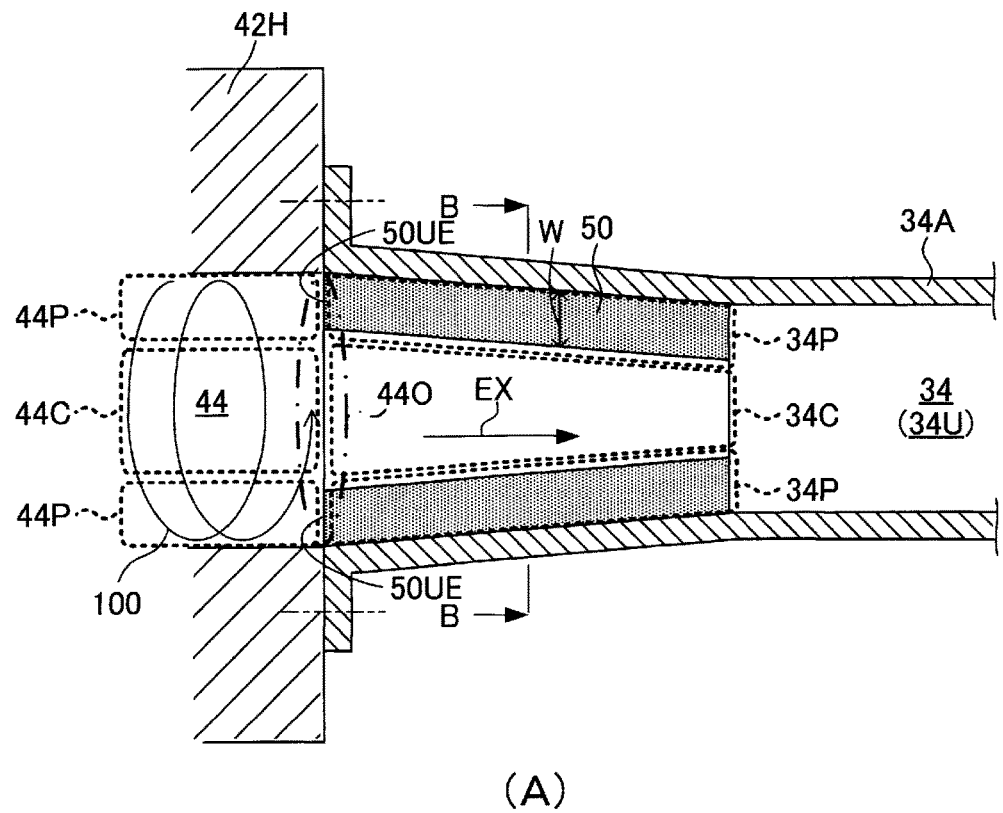
(A)
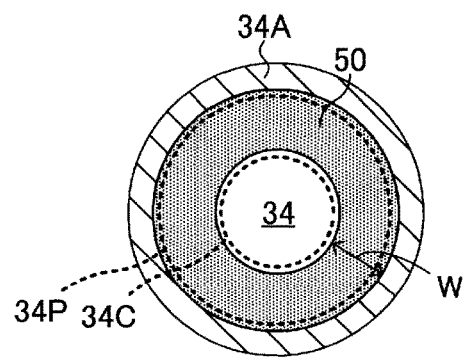
(B)

[Fig. 12]
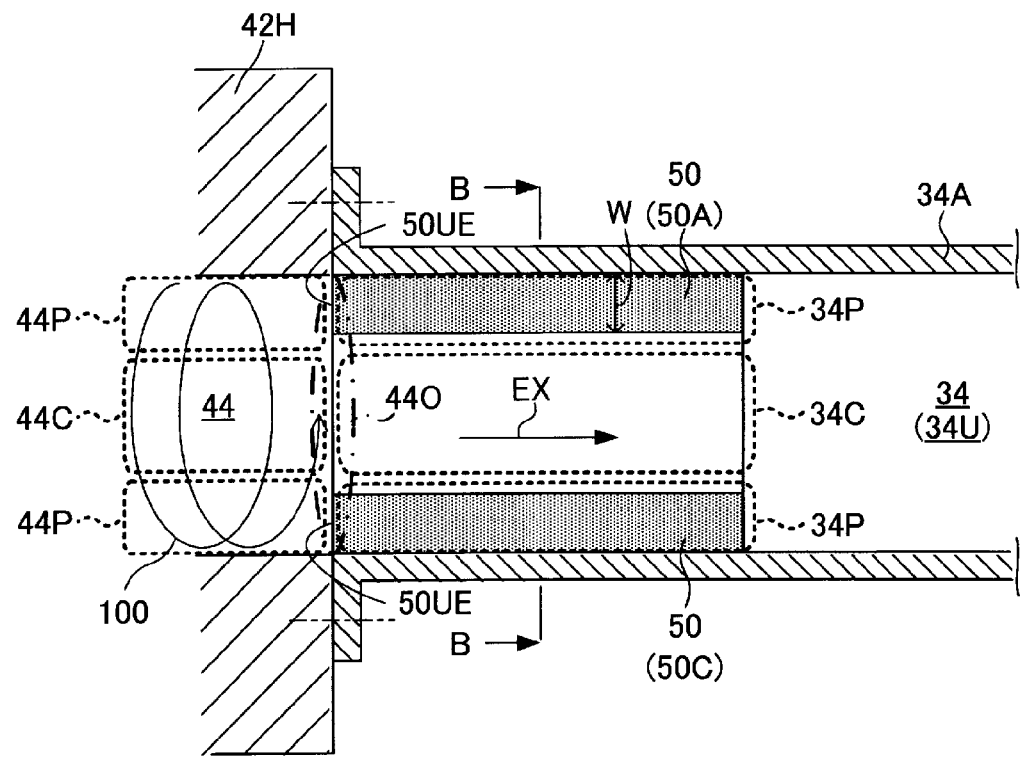
(A)
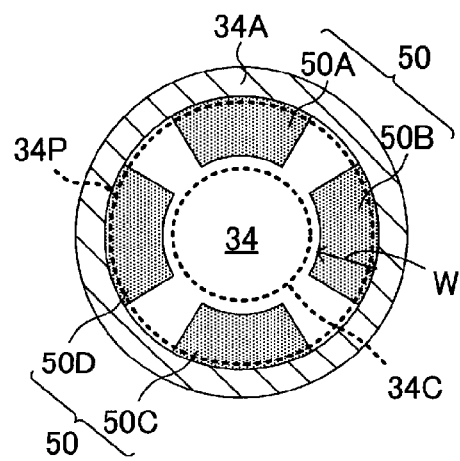
(B)

[Fig. 13]
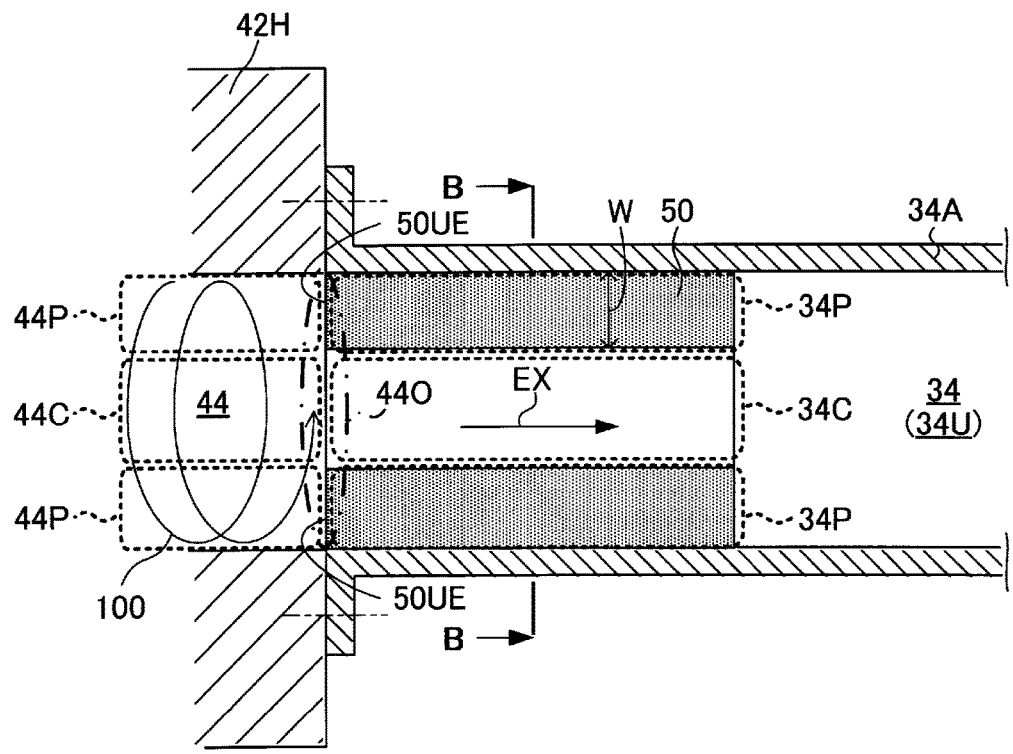
(A)
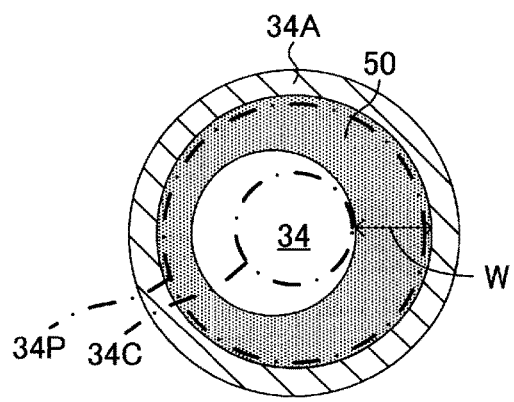
(B)

[Fig. 14]
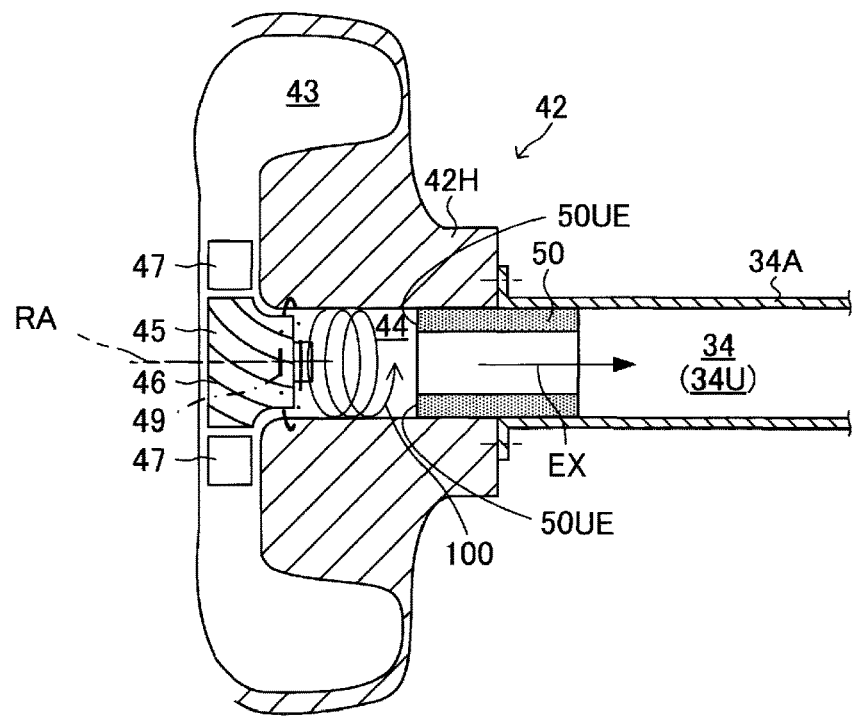
[Fig. 15]
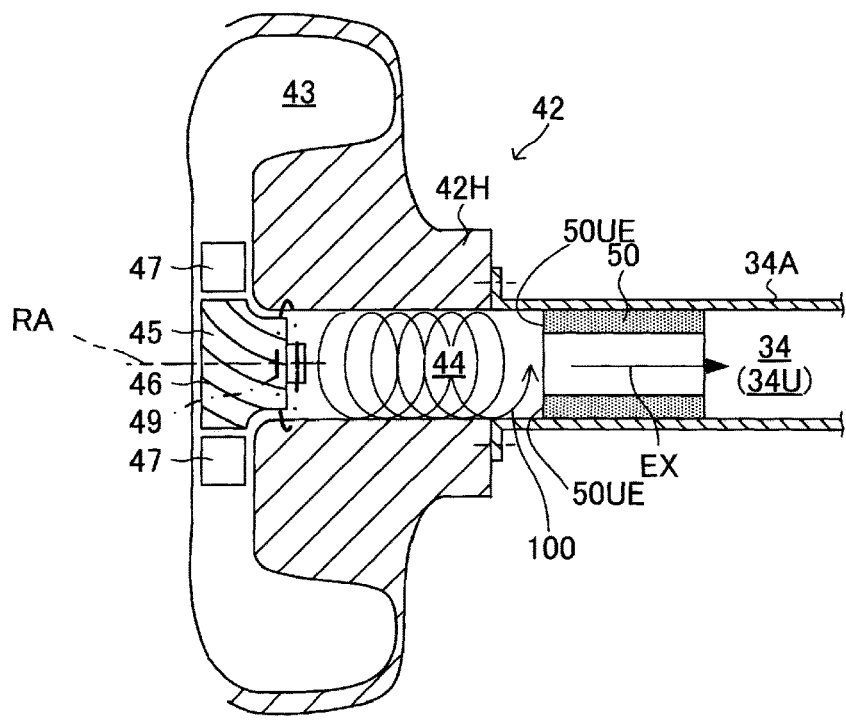

[Fig. 16]
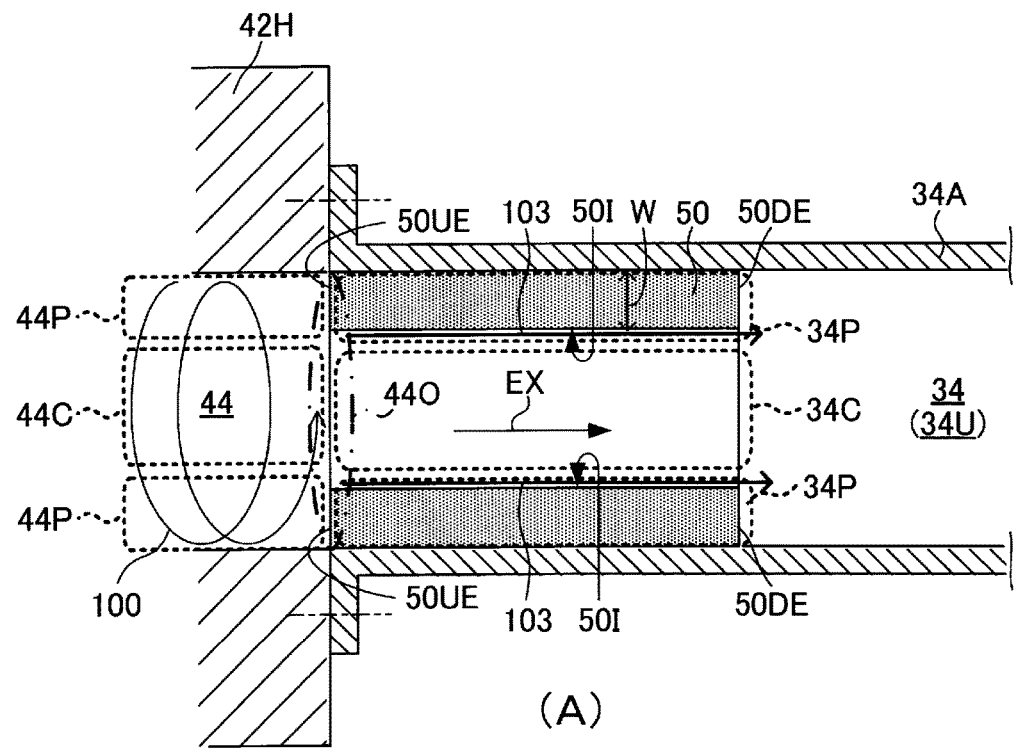
(A)
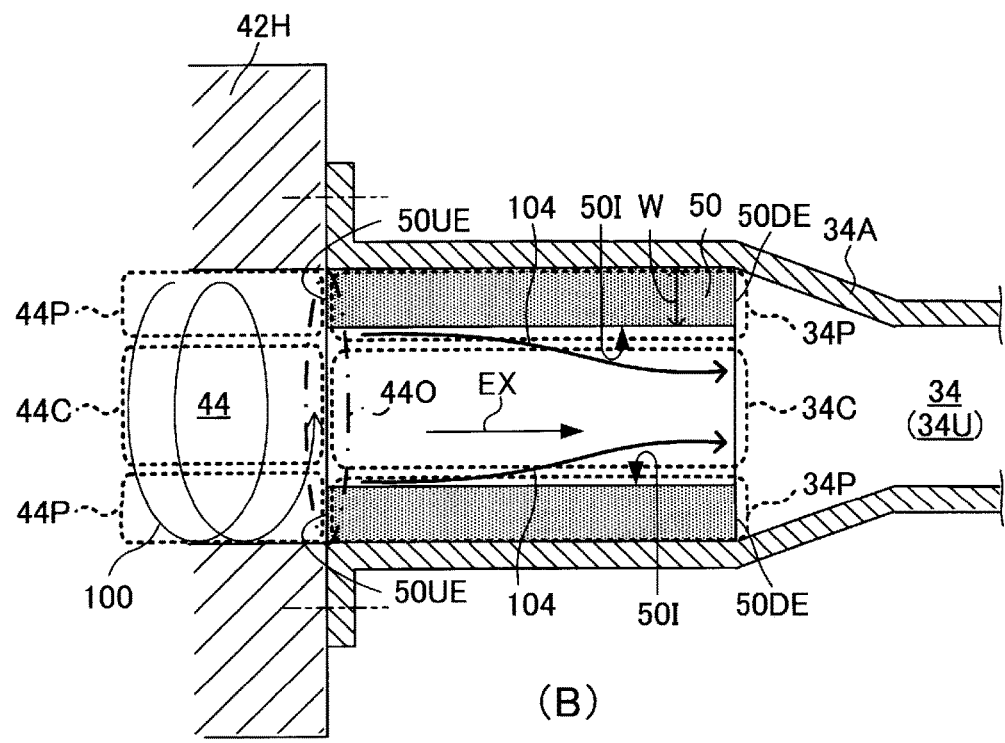
(B)

[Fig. 17]
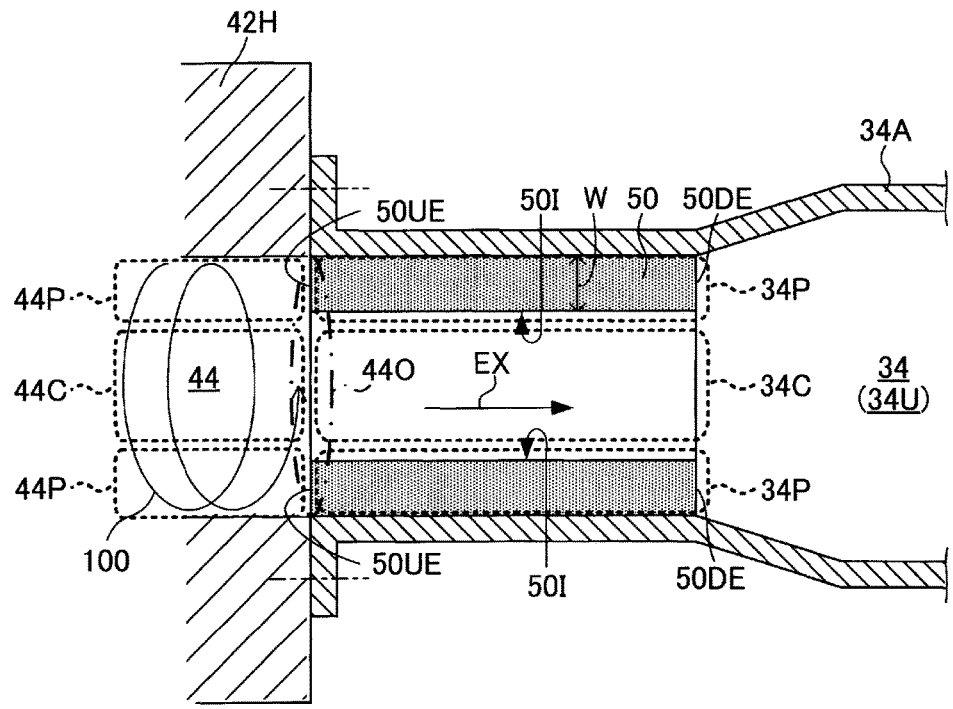
[Fig. 18]
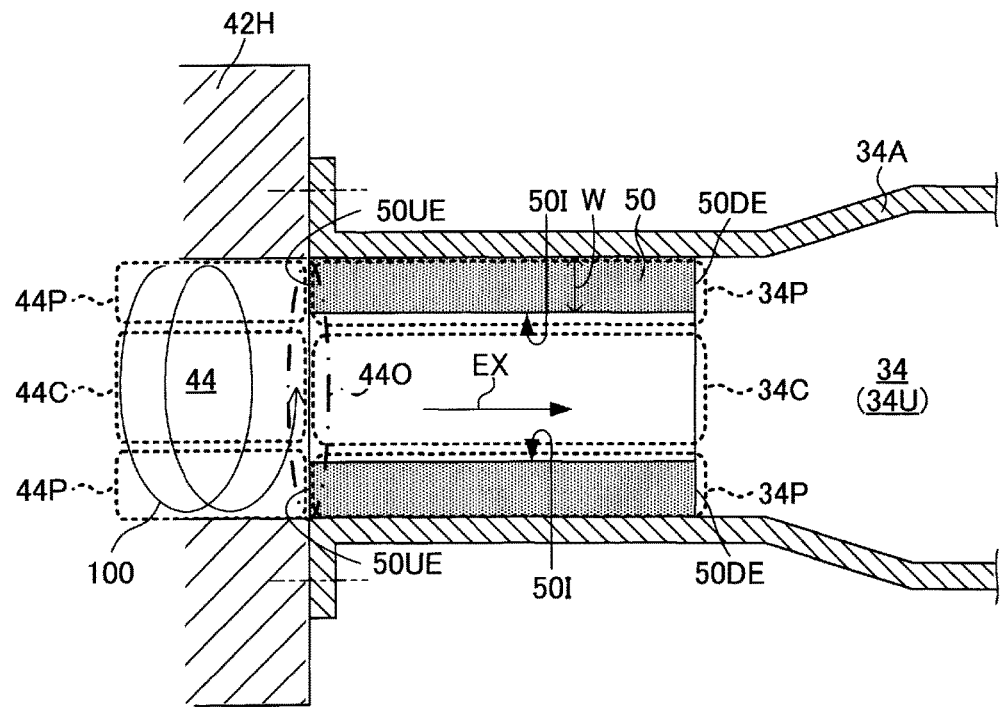

[Fig. 19]
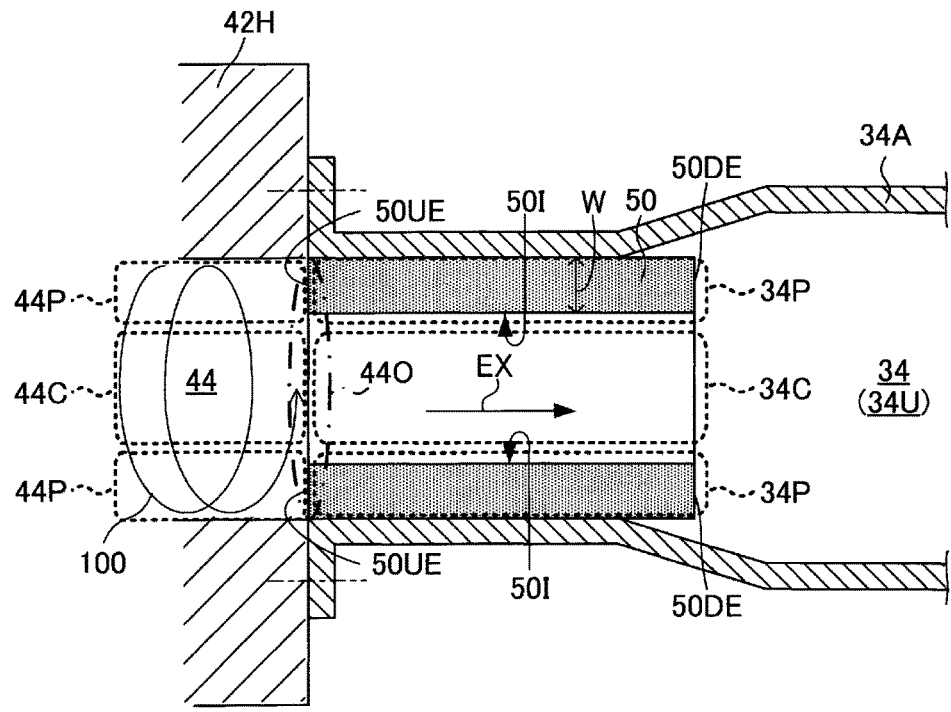
[Fig. 20]
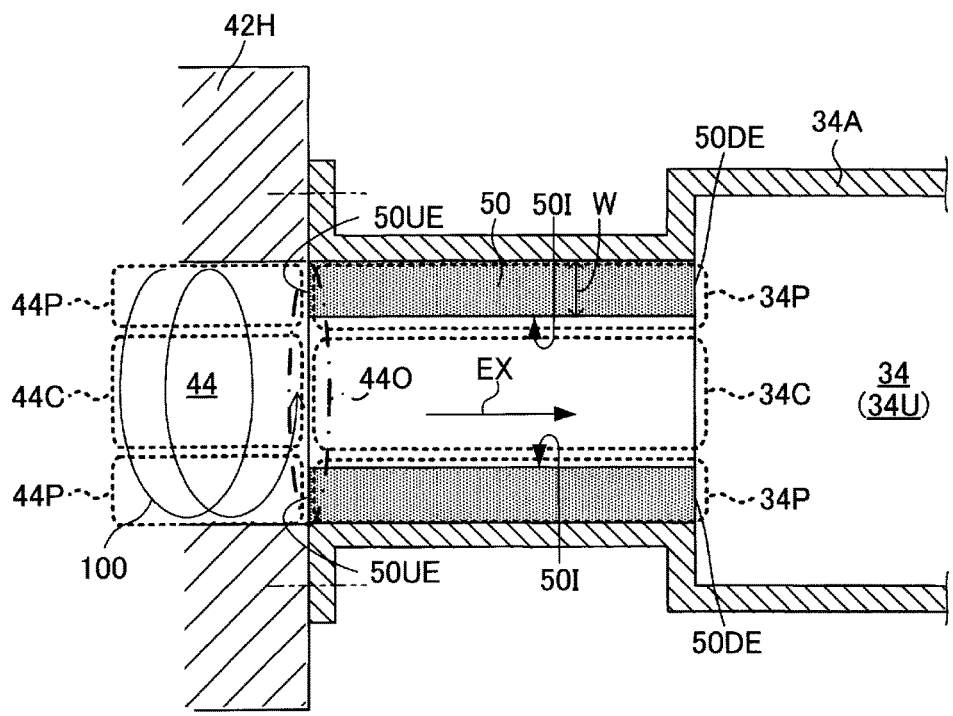

[Fig. 21]
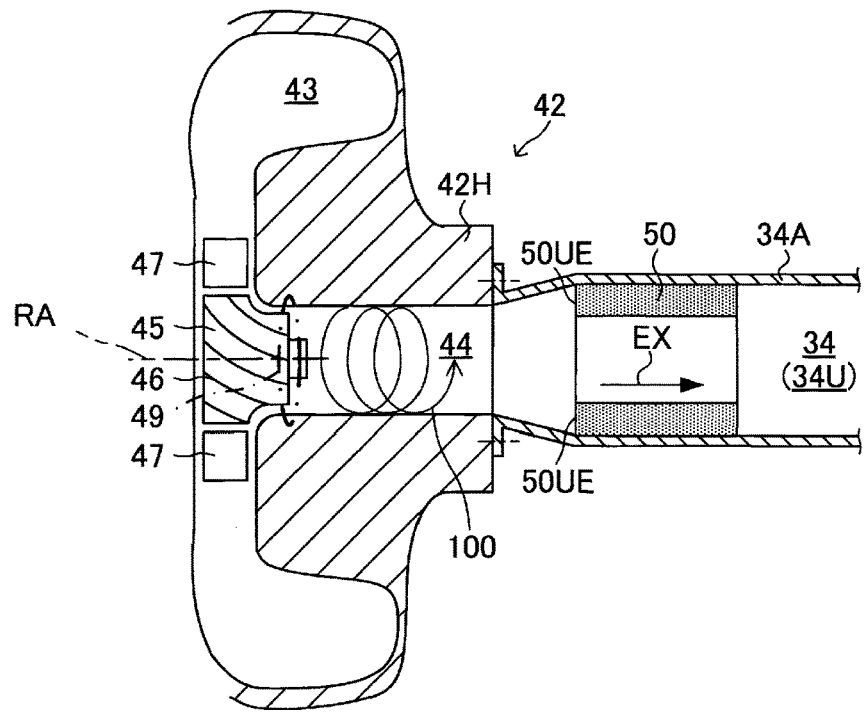
[Fig. 22]
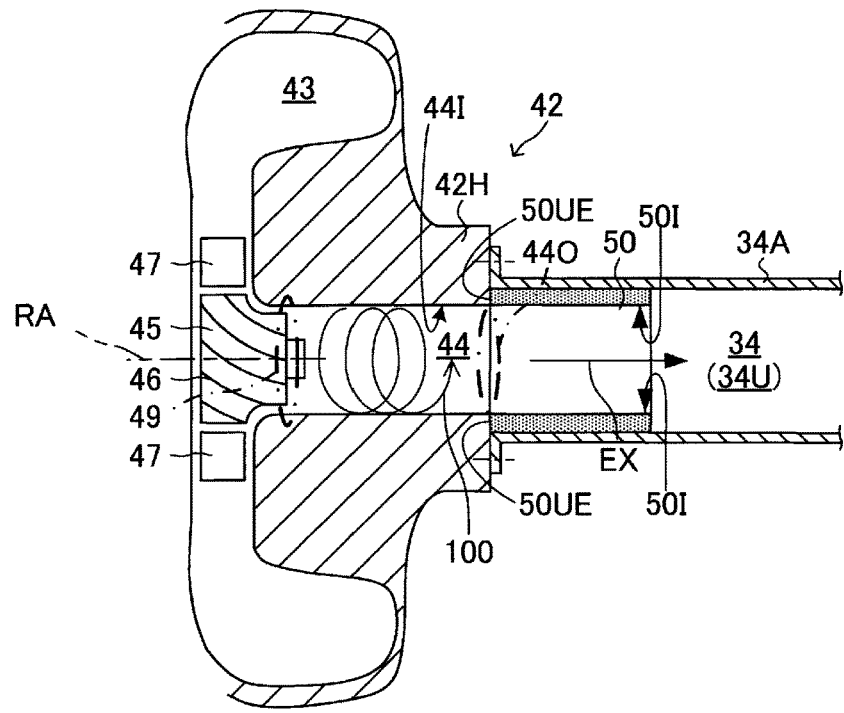

EXHAUST GAS PURIFICATION SYSTEM OF INTERNAL COMBUSTION ENGINE HAVING TURBOCHARGER

CROSS-REFERENCE TO RELATED APPLICATIONS

This is a national phase application based on the PCT International Patent Application No. PCT/JP2014/005314 filed Oct. 20, 2014, claiming priority to Japanese Patent Application No. 2014-061268 filed Mar. 25, 2014, the entire contents of both of which are incorporated herein by reference.

TECHNICAL FIELD

This invention relates to an exhaust gas purification system of an internal combustion engine having a turbocharger.

BACKGROUND ART

An exhaust gas purification apparatus of a diesel engine (an internal combustion engine) having a turbocharger, is described in the PTL 1 (hereinafter, this apparatus will be referred to as—conventional apparatus—). The conventional apparatus has a diesel particulate filter (DPF). This filter has a honeycomb configuration including a number of passages, each defined by porous walls. When an exhaust gas flows through the passages or pores of the porous walls of the DPF, particulates included in the exhaust gas are trapped on surfaces of the porous walls and surfaces defining the pores of the porous walls.

In the diesel engine described in the PTL 1, immediately after the exhaust gas flows out from turbine blades (a turbine wheel) of the turbocharger, the exhaust gas flows under a turbulent condition. In the conventional apparatus, the DPF is disposed just downstream of the turbine blades. Thereby, the exhaust gas flows evenly into the DPF and thus, the DPF can efficiently trap the particulates included in the exhaust gas.

CITATION LIST

Patent Literature

PTL 1: JP 2005-69083 A1

SUMMARY OF INVENTION

A rate of trapping the particulates by the DPF of the conventional apparatus can be increased by providing an entire flow area of a flow passage thereof with the porous walls and increasing the number of the porous walls and/or decreasing a radius of each pore of the porous walls. In this case, a density of the porous walls per unit volume of the DPF increases. Thus, a flow passage resistance of the DPF increases.

This is applied to an exhaust gas purification catalyst including a catalytic metal and carrier walls for carrying the catalytic metal to purify the exhaust gas. In other words, an efficiency of purifying the exhaust gas by the exhaust gas purification catalyst can be increased by providing the carrier walls within the entire flow area of the flow passage, increasing the number of the carrier walls to increase the total surface area of the carrier walls and increasing the amount of the catalytic metal carried on and/or in the carrier walls. However, in this case, the density of the carrier walls per unit volume of the exhaust gas purification catalyst increases. Therefore, the flow passage resistance of the exhaust gas purification catalyst increases.

As described above, in the exhaust gas purification apparatus such as the DPF and the exhaust gas purification catalyst, when the density of an exhaust gas purification member such as the porous walls of the DPF provided across the entire flow passage and the carrier walls of the exhaust gas purification catalyst provided across the entire flow passage, is increased, the efficiency of the exhaust gas purification by the exhaust gas purification apparatus increases. However, the flow passage resistance of the exhaust gas purification apparatus increases.

The object of the present invention is to provide an exhaust gas purification system of an internal combustion engine which can efficiently purify the exhaust gas by an exhaust gas purification apparatus without excessively increasing the flow passage resistance of an exhaust passage part at an area where the exhaust gas purification apparatus is disposed.

An exhaust gas purification system according to the present invention is applied to an internal combustion engine.

The engine has:

(a1) a turbocharger including a turbine wheel and a housing for housing the turbine wheel, the housing defining a turbine outlet passage communicating with an exhaust gas discharging part of the turbine wheel, and (a2) an exhaust passage part communicating with an exhaust gas outlet of the turbine outlet passage.

The exhaust gas purification system according to the present invention comprises an exhaust gas purification apparatus for purifying an exhaust gas discharged from the engine. The exhaust gas purification apparatus is disposed in (b1) the exhaust passage part at a position adjacent to the exhaust gas outlet of the turbine outlet passage and/or (b2) the turbine outlet passage. Further, the exhaust gas purification apparatus includes an exhaust gas purification member relating to the purification of the exhaust gas. For instance, the exhaust gas purification apparatus includes an exhaust gas purification catalyst or a DPF.

After the exhaust gas is discharged from the exhaust gas discharging part of the turbine wheel, the exhaust gas flows through the turbine outlet passage, whirling about a rotation axis of the turbine wheel. In particular, when the flow rate of the exhaust gas passing through the turbine wheel is small, the exhaust gas is likely to whirl and flow through the turbine outlet passage. Therefore, the flow velocity of the exhaust gas flowing through the peripheral part of the turbine outlet passage is larger than that of the exhaust gas flowing through the central part of the turbine outlet passage. Thus, the substantial portion of the exhaust gas flows through the peripheral part of the turbine outlet passage. As a result, the substantial portion of the exhaust gas flows out from the exhaust gas outlet of the turbine outlet passage into the peripheral part of the exhaust passage part. In particular, when the turbocharger includes nozzle vanes for adjusting the flow velocity of the exhaust gas flowing into the turbine wheel, the flow rate of the exhaust gas flowing through the peripheral part of the exhaust passage part increases as the flow velocity of the exhaust gas flowing into the turbine wheel is increased by the nozzle vanes.

Thus, when the exhaust gas purification apparatus is disposed in (b1) the exhaust passage part at a position adjacent to the turbine outlet passage and/or (b2) the turbine outlet passage, the substantial portion of the exhaust gas flows into the peripheral part of the exhaust gas purification apparatus through the upstream end portion of the peripheral part of the apparatus. Therefore, in terms of efficiently purifying the exhaust gas by the exhaust gas purification apparatus without excessively increasing the flow passage resistance of the exhaust passage part and/or the turbine outlet passage at the area where the exhaust gas purification apparatus is disposed, it is preferred that a member relating to the purification of the exhaust gas (the exhaust gas purification member) in the exhaust gas purification apparatus is dense at the peripheral part of the exhaust gas purification apparatus. For instance, the exhaust gas purification member may include a carrier wall or carrier walls of an exhaust gas purification catalyst for carrying a catalytic metal thereon or may include porous walls of the DPF.

For the reasons described above, the exhaust gas purification member of the present invention is provided in the exhaust gas purification apparatus such that (c1) a density of the member located in a peripheral part of the exhaust passage part and/or the turbine outlet passage is larger than that of the member located in a central part of the exhaust passage part and/or said turbine outlet passage and (c2) a flow passage resistance per unit volume of the member at an area of the central part of the exhaust passage part and/or the turbine outlet passage in an exhaust gas flowing direction is smaller than that of the member at an area of the peripheral part of the exhaust passage part and/or the turbine outlet passage in the exhaust gas flowing direction.

As a result, according to the present invention, the exhaust gas can be efficiently purified without excessively increasing the flow passage resistance of the exhaust passage part and/or the turbine outlet passage at the area where the exhaust gas purification apparatus is disposed.

Further, according to the present invention, the exhaust gas purification ability of the peripheral part of the exhaust gas purification apparatus is larger than that of the central part of the exhaust gas purification apparatus. Thus, in terms of efficiently purifying the exhaust gas, it is preferred that the exhaust gas flows through the entire length of the peripheral part of the exhaust gas purification apparatus after the exhaust gas flows into the peripheral part of the exhaust gas purification apparatus through the upstream end portion of the peripheral part of the apparatus.

Therefore, it is preferred that the exhaust gas purification apparatus of the present invention has upstream and downstream end portions and the exhaust passage part enlarges from a position adjacent to the downstream end portion of the exhaust gas purification apparatus in the exhaust gas flowing direction. It should be noted that the position adjacent to the downstream end portion of the exhaust gas purification apparatus may include (d1) a position upstream or downstream of the downstream end portion of the exhaust gas purification apparatus or (d2) a position corresponding to the downstream end portion of the exhaust gas purification apparatus.

Thereby, after the exhaust gas flows through the peripheral part of the exhaust gas purification apparatus, the exhaust gas flows out radially outwards from the downstream end portion of the peripheral part of the exhaust gas purification apparatus. Therefore, after the exhaust gas flows into the peripheral part of the exhaust gas purification apparatus through the upstream end portion of the peripheral part of the apparatus, the exhaust gas easily flows through the entire length of the exhaust gas purification apparatus, compared with the following cases (A) and (B):

(A) Case that the exhaust passage part narrows from a position adjacent to the downstream end portion of the exhaust gas purification apparatus in the exhaust gas flowing direction.

(B) Case that the exhaust passage part has a constant shape which does not change in the exhaust gas flowing direction from the downstream end portion of the exhaust gas purification apparatus.

In other words, the increased amount of the exhaust gas easily flows through the entire length of the dense peripheral part of the exhaust gas purification apparatus. Therefore, the exhaust gas can be efficiently purified by the exhaust gas purification apparatus.

Further, in terms of efficiently purifying the exhaust gas, it is preferred that (e1) the increased amount of the exhaust gas flows into the peripheral part of the exhaust gas purification apparatus through the upstream end portion of the peripheral part of the apparatus or (e2) the exhaust gas flows evenly into the peripheral part of the exhaust gas purification apparatus through the upstream end portion of the peripheral part of the apparatus.

For the reasons described above, it is preferred that the turbine outlet passage and/or the exhaust passage part extends straight coaxially with a rotation axis of the turbine wheel from the exhaust gas discharging part of the turbine wheel to the exhaust gas purification apparatus.

Thereby, the decreasing of the whirling force of the exhaust gas discharged from the exhaust gas discharging part of the turbine wheel, is small, compared with the case that the turbine outlet passage and/or the exhaust passage part curves at an area upstream of the exhaust gas purification apparatus. Therefore, the large amount of the exhaust gas flows into the peripheral part of the exhaust gas purification apparatus through the upstream end portion of the peripheral part of the apparatus. Thus, the exhaust gas purification apparatus can efficiently purify the exhaust gas.

Further, the exhaust gas purification apparatus of the present invention may include a catalyst apparatus having a carrier wall which corresponds to the exhaust gas purification member and a catalytic metal carried on either wall surface of the carrier wall, and the carrier wall of the catalyst apparatus is formed to have a hollow shape such that the carrier wall is provided only in the peripheral part of the exhaust passage part and/or the turbine outlet passage.

Thereby, the increased amount of the exhaust gas flows through the interior of the catalyst apparatus as well as along the wall surface of the catalyst apparatus at the central part side of the exhaust passage part and/or the turbine outlet passage (that is, along the wall surface defining the hollow space of the catalyst apparatus). Thus, the exhaust gas easily contacts the catalytic metal. Therefore, the catalyst apparatus can efficiently purify the exhaust gas.

BRIEF DESCRIPTION OF DRAWINGS

FIG. 1 is a view showing an internal combustion engine which an exhaust gas purification system according to an embodiment of the present invention is applied.

FIG. 2 is a view showing a sub-catalyst of the exhaust gas purification system and a turbine wheel of a turbocharger of the engine and the surrounding thereof according to the embodiment.

FIG. 3(A) is a longitudinal sectional view of the sub-catalyst and the surroundings thereof according to the embodiment and FIG. 3(B) is a cross-sectional view along the line B-B of FIG. 3(A).

FIG. 4 is a view similar to FIG. 3(B), showing a concrete example of the sub-catalyst according to the embodiment.

FIG. 5(A) is a view similar to FIG. 3(B), showing another concrete example of the sub-catalyst according to the embodiment, FIG. 5(B) is a view similar to FIG. 3(B), showing further another concrete example of the sub-catalyst according to the embodiment, and FIG. 5(C) is a view similar to FIG. 3(B), showing still further another concrete example of the sub-catalyst according to the embodiment.

FIG. 6(A) is a longitudinal sectional view of a main-catalyst and the surroundings thereof according to the embodiment and FIG. 6(B) is a cross-sectional view along the line B-B of FIG. 6(A).

FIG. 7 is a view similar to FIG. 6(B), showing a concrete example of the main-catalyst according to the embodiment.

FIG. 8(A) is a longitudinal sectional view of a modified example of the sub-catalyst and the surroundings thereof according to the embodiment and FIG. 8(B) is a cross-sectional view along the line B-B of FIG. 8(A).

FIG. 9(A) is a longitudinal sectional view of another modified example of the sub-catalyst and the surroundings thereof according to the embodiment and FIG. 9(B) is a cross-sectional view along the line B-B of FIG. 9(A).

FIG. 10(A) is a longitudinal sectional view of further another modified example of the sub-catalyst and the surroundings thereof according to the embodiment and FIG. 10(B) is a cross-sectional view along the line B-B of FIG. 10(A).

FIG. 11(A) is a longitudinal sectional view of still further another modified example of the sub-catalyst and the surroundings thereof according to the embodiment and FIG. 11(B) is a cross-sectional view along the line B-B of FIG. 11(A).

FIG. 12(A) is a longitudinal sectional view of still further another modified example of the sub-catalyst and the surroundings thereof according to the embodiment and FIG. 12(B) is a cross-sectional view along the line B-B of FIG. 12(A).

FIG. 13(A) is a longitudinal sectional view of still further another modified example of the sub-catalyst and the surroundings thereof according to the embodiment and FIG. 13(B) is a cross-sectional view along the line B-B of FIG. 13(A).

FIG. 14 is a view similar to FIG. 2, showing a modified example of the exhaust gas purification system according to the embodiment.

FIG. 15 is a view similar to FIG. 2, showing another modified example of the exhaust gas purification system according to the embodiment.

FIG. 16(A) is a view similar to FIG. 3(A), showing a flow of the exhaust gas which flows through the sub-catalyst according to the embodiment and FIG. 16(B) is a longitudinal sectional view of an oxidation catalyst and the surroundings thereof to be compared with the sub-catalyst according to the embodiment.

FIG. 17 is a view similar to FIG. 3(A), showing still further another modified example of the exhaust gas purification system according to the embodiment.

FIG. 18 is a view similar to FIG. 3(A), showing still further another modified example of the exhaust gas purification system according to the embodiment.

FIG. 19 is a view similar to FIG. 3(A), showing still further another modified example of the exhaust gas purification system according to the embodiment.

FIG. 20 is a view similar to FIG. 3(A), showing still further another modified example of the exhaust gas purification system according to the embodiment.

FIG. 21 is a view similar to FIG. 2, showing still further another modified example of the exhaust gas purification system according to the embodiment.

FIG. 22 is a view similar to FIG. 2, showing still further another modified example of the exhaust gas purification system according to the embodiment.

DESCRIPTION OF EMBODIMENTS

The embodiment of the exhaust gas purification system of the internal combustion engine according to the present invention will be described. As shown in FIG. 1, the internal combustion engine which the exhaust gas purification system according to this embodiment is applied, is a diesel engine. This engine has an engine body 10, an intake system 20, an exhaust system 30 and a turbocharger 40.

Cylinder bores 12 are formed in a cylinder block 11 of the engine body 10. A piston 13 is disposed in each of the cylinder bores 12. A combustion chamber 15 is defined by a top wall surface of the piston 13, a bottom wall surface of a cylinder head 14 of the engine body 10 and an inner peripheral wall surface defining the cylinder bore 12.

Fuel injectors 16 are provided in the cylinder head 14. Each of the injectors 16 injects a fuel directly into the corresponding combustion chamber 15. Intake and exhaust ports 21 and 31 are formed in the cylinder head 14. In addition, intake and exhaust valves 22 and 32 are provided in the cylinder head 14.

The intake system 20 is connected to the intake ports 21. A throttle valve 23 for adjusting an amount of an air (an intake air) suctioned into the combustion chambers 15, an intercooler 24 for cooling the intake air, a compressor part 41 of the turbocharger 40 for compressing the intake air and an air flow meter 25 for detecting an amount of the intake air are disposed in the intake system 20 in order from the downstream side to the upstream side in an air flowing direction (that is, a direction of the flow of the air in the intake system 20).

The intake system 20 has intake passage parts (intake pipes) 26 to 28. The intake passage part 26 connects intake air inlets of the intake ports 21 to an intake air outlet of the intercooler 24. The throttle valve 23 is disposed in this intake passage part 26. The intake passage part 27 connects an intake air inlet of the intercooler 24 to an intake air outlet of the compressor part 41. The intake passage part 28 is connected to an intake air inlet of the compressor part 41 at its one end and opens to the outside air at its other end. The air flow meter 25 is disposed in this intake passage part 28.

The exhaust system 30 is connected to the exhaust ports 31. A turbine part 42 of the turbocharger 40, an oxidation catalyst 50 for partially purifying a HC (a hydrocarbon) and a CO (a carbon monoxide) included in the exhaust gas (hereinafter, this catalyst will be referred to as—sub-catalyst—) and an oxidation catalyst 60 for purifying the remaining HC and CO in the exhaust gas (hereinafter, this catalyst will be referred to as—main-catalyst—) are disposed in the exhaust system 30 in order along an exhaust gas flowing direction EX (a direction of the flow of the exhaust gas in the exhaust system 30).

The exhaust system 30 has exhaust passage parts 33 and 34 (exhaust pipes 33A and 34A). The exhaust passage part 33 connects exhaust gas outlets of the exhaust ports 31 to an exhaust gas inlet of the turbine part 42. The exhaust passage part 34 is connected to an exhaust gas outlet of the turbine part 42 at its one end and opens to the outside air at its other end. This exhaust passage part 34 has a portion extending straight (an upstream straight portion) 34U, a curved portion 34B and a portion extending straight (a downstream straight portion) 34D in order along the exhaust gas flowing direction EX. The sub-catalyst 50 is disposed in the upstream straight portion 34U and the main-catalyst 60 is disposed in the downstream straight portion 34D.

The turbocharger 40 is a variable capacity type turbocharger or a variable nozzle type turbocharger. As shown in FIG. 2, the turbine part 42 of the turbocharger 40 has a housing 42H, which houses a turbine wheel 45. A scroll passage 43 and a turbine outlet passage 44 are formed in the housing 42H. The turbine wheel 45 is disposed between the scroll passage 43 and the turbine outlet passage 44. Therefore, the turbine outlet passage 44 communicates with an exhaust gas discharging part 49 of the turbine wheel 45. In addition, the turbine outlet passage 44 extends straight along and coaxially with a rotation axis RA of the turbine wheel 45. Also, the upstream straight portion 34U of the exhaust passage part 34 extends straight along and coaxially with the rotation axis RA of the turbine wheel 45.

A plurality of nozzle vanes 47 are disposed at an equal angle interval around the turbine wheel 45. The vanes 47 adjust a flow rate of the exhaust gas flowing into spaces each defined between turbine blades 46 of the turbine wheel 45. After the exhaust gas flows into the scroll passage 43 through the exhaust gas inlet of the turbine part 42 from the exhaust passage part 33, the exhaust gas flows through passages (nozzles) between the nozzle vanes 47 into the spaces each defined between the turbine blades 46 of the turbine wheel 45. The turbine wheel 45 is rotated by an energy of the exhaust gas flowing into the spaces each between the turbine blades 46. Thereby, as shown in FIG. 1, an impeller (not shown) of the compressor part 41 connected to the turbine wheel 45 via a shaft 48, is rotated. The intake air is compressed by this rotation of the impeller.

As shown by an arrow 100 in FIGS. 2 and 3, after the exhaust gas flows out from the spaces between the turbine blades 46 via the exhaust gas discharging part 49 of the turbine wheel 45, the exhaust gas flows downstream through the turbine outlet passage 44, whirling about the rotation axis RA of the turbine wheel 45. Then, the exhaust gas flows out from the exhaust gas outlet 44O of the turbine outlet passage 44 into the exhaust passage part 34.

As shown in FIGS. 2 and 3, the sub-catalyst 50 is disposed in the exhaust passage part 34 (in particular, the upstream straight portion 34U) at a position adjacent to the turbine outlet passage 44. As shown in FIG. 3, the sub-catalyst 50 is not provided in a central part 34C of the exhaust passage part 34. In other words, the catalyst 50 is provided only in a peripheral part 34P of the exhaust passage part 34. In this embodiment, as shown in FIG. 3(B), the central part 34C of the exhaust passage part 34 corresponds to a portion (a space) formed by extending the central area of the cross section of the exhaust passage part 34 in the exhaust gas flowing direction EX (the direction of the flow of the exhaust gas through the exhaust system 30). On the other hand, the peripheral part 34P of the exhaust passage 34 corresponds to a portion (a space) formed by extending an area at an outer side of the central area of the cross section of the exhaust passage part 34 in the exhaust gas flowing direction EX.

The sub-catalyst 50 has a constant outer shape which does not change in the exhaust gas flowing direction EX under the state that the catalyst 50 is disposed in the exhaust passage part 34. In other words, the catalyst 50 has a cylindrical outer shape having a constant thickness. The outer shape corresponds to a shape of an outer wall surface of an outermost portion of the catalyst 50 along the cross section of the catalyst 50 shown in FIG. 3(B).

In particular, as shown in FIG. 4, the sub-catalyst 50 includes a carrier wall 51 and a catalytic metal 52 carried on the carrier wall 51. The carrier wall 51 has a circumferentially corrugated shape along the cross section of the sub-catalyst 50 shown in FIG. 4. The catalytic metal 52 is carried on either wall surface of the carrier wall 51 ("the wall surface 51B of the carrier wall 51 facing the inner wall surface of the exhaust pipe 34A defining the exhaust passage part 34" and "the wall surface 51A of the carrier wall 51 facing the central part 34 C of the exhaust passage part 34").

The sub-catalyst 50 may be configured as shown in FIG. 5(A). This sub-catalyst 50 has a honeycomb configuration provided with a plurality of passages 54 defined by a plurality of planar partition walls (i.e. carrier walls for carrying the catalytic metal thereon) 53. This catalyst 50 is formed of the carrier walls 53 and the catalytic metal (not shown) carried on the carrier walls 53. The carrier walls 53 are not provided in the central part 34C of the exhaust passage part 34. In other words, the carrier walls 53 are provided only in the peripheral part 34P of the exhaust passage part 34.

The sub-catalyst 50 may be configured as shown in FIG. 5(B). Similar to the sub-catalyst 50 shown in FIG. 5(A), the sub-catalyst 50 shown in FIG. 5(B) has a honeycomb configuration. This catalyst 50 includes the carrier walls 53 and the catalytic metal (not shown) carried on the carrier walls 53. However, in contrast to the sub-catalyst 50 shown in FIG. 5(A), the carrier walls 53 are provided in the central portion 34C of the exhaust passage part 34 as well as the peripheral part 34P of the exhaust passage part 34.

In this example shown in FIG. 5(B), a density of the carrier walls 53 provided in the peripheral part 34P of the exhaust passage part 34 per unit volume (a density per unit area along the cross section) is larger than that provided in the central part 34C of the exhaust passage part 34 per unit volume.

In other words, the carrier walls 53 are provided in the sub-catalyst 50 such that the carrier walls 53 are provided more densely in the peripheral part 34P of the exhaust passage 34 than the central part 34C of the exhaust passage part 34 and the flow passage resistance of the carrier walls 53 per unit volume in the exhaust gas flowing direction EX at the central part 34 C of the exhaust passage part 34 is smaller than that at the peripheral part 34P of the exhaust passage part 34.

It should be noted that also in the embodiments shown in FIGS. 4 and 5(A), the carrier wall 51 and the carrier walls 53 are provided in the sub-catalyst 50 such that (f1) the carrier wall 51 and the carrier walls 53 are provided more densely in the peripheral part 34P of the exhaust passage 34 than the central part 34C of the exhaust passage part 34 and (f2) the flow passage resistance of the carrier wall 51 and the carrier walls 53 per unit volume in the exhaust gas flowing direction EX at the central part 34C of the exhaust passage part 34 is smaller than that at the peripheral part 34P of the exhaust passage part 34.

The sub-catalyst 50 may be configured as shown in FIG. 5(C). This sub-catalyst 50 has passages 54 defined by carrier walls 53R and 53C. Each of the carrier walls 53R extends radially from the central axis of the sub-catalyst 50. Each of the carrier walls 53C extends circumferentially about the central axis of the sub-catalyst 50. This catalyst 50 includes the catalytic metal (not shown) carried on the carrier walls 53R and 53C. The carrier walls 53R and 53C are not provided in the central part 34C of the exhaust passage part 34. In other words, the carrier walls 53R and 53C are provided only in the peripheral part 34P of the exhaust passage part 34.

As shown in FIG. 6, the main-catalyst 60 is provided in the central and peripheral parts 34C and 34P of the exhaust passage 34 (in particular, the downstream straight part 34D). The catalyst 60 has a constant outer shape which does not change in the exhaust gas flowing direction EX under the state that the catalyst 60 is disposed in the exhaust passage part 34. In other words, the catalyst 60 has a solid cylindrical shape. The outer shape corresponds to a shape of an outer wall surface of an outermost portion of the catalyst 60 along the cross section of the catalyst 60 shown in FIG. 6(B).

For example, as shown in FIG. 7, this main-catalyst 60 has a honeycomb configuration provided with a plurality of passages 62 defined by a plurality of planar partition walls (carrier walls for carrying the catalytic metal thereon) 61. The catalyst 60 includes the carrier walls 61 and the catalytic metal (not shown) carried on the carrier walls 61. The carrier walls 61 are provided in the central and peripheral parts 34C and 34P of the exhaust passage 34. In this example, a density of the carrier walls 61 of the main-catalyst 60 provided in the exhaust passage part 34 per unit volume is constant (or generally constant) over the entire area of the main-catalyst 60.

Next, the function of the exhaust gas purification system according to the embodiment will be described. As shown by the arrow 100 in FIGS. 2 and 3, after the exhaust gas flows out from the exhaust gas discharging part 49 of the turbine wheel 45, the exhaust gas flows through the turbine outlet passage 44, whirling about the rotation axis RA of the turbine wheel 45 from the influence of the rotation of the turbine wheel 45. Therefore, as shown in FIG. 3, the flow rate of the exhaust gas in a peripheral part 44P of the turbine outlet passage 44 is larger than that in a central part 44C of the turbine outlet passage 44. Thus, the substantial portion of the exhaust gas flows through the peripheral part 44P of the turbine outlet passage 44. Therefore, when the exhaust gas is discharged from the exhaust gas outlet 44O of the turbine outlet passage 44 to the exhaust passage part 34, the substantial portion of the exhaust gas flows into the peripheral part 34P of the exhaust passage part 34. In other words, the substantial portion of the exhaust gas flows into the sub-catalyst 50 through an upstream end portion 50U of the catalyst 50.

It should be noted that the central part 44C of the turbine outlet passage 44 corresponds to a portion (a space) formed by extending a central area of the cross section of the turbine outlet passage 44 in the exhaust gas flowing direction EX (the direction of the flow of the exhaust gas through the exhaust system 30). On the other hand, the peripheral part 44P of the turbine outlet passage 44 corresponds to a portion (a space) formed by extending an area at an outer side of the central area of the cross section of the turbine outlet passage 44 in the exhaust gas flowing direction EX.

In this embodiment, the sub-catalyst 50 is provided only in the peripheral part 34P of the exhaust passage part 34 at a position adjacent to the turbine outlet passage 44 and is not provided in the central part 34C of the exhaust passage part 34. Therefore, although the sub-catalyst 50 is disposed in the exhaust passage part 34, the increase of the flow passage resistance of the exhaust passage part 34 at the area where the sub-catalyst 50, is small.

On the other hand, the sub-catalyst 50 is provided only in the peripheral part 34P of the exhaust passage part 34 and is not provided in the central part 34C of the exhaust passage part 34. However, as described above, the substantial portion of the exhaust gas discharged from the turbine outlet passage 44, flows into the catalyst 50 through the upstream end portion 50UE of the catalyst 50. As shown by an arrow 101 in FIG. 3, after the exhaust gas flows into the catalyst 50, the exhaust gas flows through the interior of the catalyst 50, whirling along an inner wall surface 50I of the catalyst 50, which surface 50I faces the central part 34C side of the exhaust passage part 34.

As described above, the substantial portion of the exhaust gas flows into the sub-catalyst 50 through the upstream end portion 50UE of the catalyst 50. Therefore, the decrease of the exhaust gas purification rate of the catalyst 50 due to the lack of the catalyst 50 in the central part 34C of the exhaust passage part 34, is small. Thus, the exhaust gas can be purified efficiently by the catalyst 50.

As a result, according to this embodiment, the exhaust gas can be purified efficiently by the sub-catalyst 50 while the excessive increase of the flow passage resistance of the exhaust passage part 34 at the area where the catalyst 50 is disposed due to the existence of the catalyst 50 in the exhaust passage part 34, can be avoided.

In addition, as described above, according to this embodiment, even when the sub-catalyst 50 is disposed at a position adjacent to the turbine part 42, the exhaust gas can be purified efficiently without excessively increasing the flow passage resistance. Therefore, the sub-catalyst 50 can be disposed at the position adjacent to the turbine part 42. Thus, when the operation of the engine 10 starts, the exhaust gas can be purified efficiently by the sub-catalyst 50.

Further, in terms of efficiently purifying the exhaust gas by the sub-catalyst 50 without excessively increasing the flow passage resistance of the exhaust passage part 34 at the area where the sub-catalyst 50 is disposed, the catalyst 50 according to this embodiment is advantageous, compared with an oxidation catalyst which has carrier walls carrying a catalytic metal in the central part 34C of the exhaust passage part 34 as well as the peripheral part 34P of the exhaust passage part 34 (hereinafter, this oxidation catalyst will be referred to as—comparative oxidation catalyst—).

In other words, the substantial portion of the exhaust gas flows into the peripheral part 34P of the exhaust passage part 34. Therefore, in order to purify the exhaust gas by the comparative oxidation catalyst with an efficiency equal to that of the sub-catalyst 50 according to this embodiment, the density per unit volume of the carrier walls of the comparative oxidation catalyst provided in the peripheral part 34P of the exhaust passage part 34 should be the same as that of the carrier wall 51 of the sub-catalyst 50. However, in the comparative oxidation catalyst, when the density per unit volume of the carrier walls of the comparative oxidation catalyst provided in the peripheral part 34P of the exhaust passage part 34, is the same as that of the carrier wall 51 of the sub-catalyst 50, the density per unit volume of the carrier walls of the comparative oxidation catalyst provided in the central part 34C of the exhaust passage part 34 is also the same as that of the carrier wall 51 of the sub-catalyst 50. As a result, the flow passage resistance of the central and peripheral parts 34C and 34P of the exhaust passage part 34 at the area where the comparative oxidation catalyst is disposed, becomes larger than that at the area where the sub-catalyst 50 is disposed.

On the other hand, in order to make the flow passage resistance concerning the comparative oxidation catalyst equal to that concerning the sub-catalyst 50 according to the embodiment, the density per unit volume of the carrier walls of the comparative oxidation catalyst should be smaller than that of the carrier wall 51 of the sub-catalyst 50. However, when the density per unit volume of the carrier walls of the comparative oxidation catalyst is smaller than that of the carrier wall 51 of the sub-catalyst 50, the density per unit volume of the carrier walls of the comparative oxidation catalyst provided in the peripheral part 34P of the exhaust passage part 34, is smaller than that of the carrier wall 51 of the sub-catalyst 50. Therefore, there is a possibility that the efficiency of the purification of the exhaust gas by the comparative oxidation catalyst decreases.

For the reasons described above, in terms of efficiently purifying the exhaust gas by the sub-catalyst 50 without excessively increasing the flow passage resistance of the exhaust passage part 34 at the area where the sub-catalyst 50 according to this embodiment is disposed, the sub-catalyst 50 is advantageous, compared with the comparative oxidation catalyst. This can be applied to the embodiments shown in FIGS. 5(A) and 5(B).

Further, according to this embodiment, the substantial portion of the exhaust gas flows through the interior of the sub-catalyst 50 as well as along the inner wall surface 50I of the catalyst 50. Therefore, the opportunity that the exhaust gas contacts the catalytic metal 52, increases. Thus, the exhaust gas can be efficiently purified by the catalyst 50.

In addition, according to this embodiment, as shown in FIG. 2, the turbine outlet passage 44 is formed, extending straight coaxially with the rotation axis RA of the turbine wheel 45 from the exhaust gas discharging outlet 49 to the exhaust gas outlet 44O. Therefore, the decrease of the whirling force of the exhaust gas flowing through the turbine outlet passage 44, is small. As a result, the substantial portion of the exhaust gas flows into the sub-catalyst 50 through the upstream end portion 50UE of the catalyst 50. Thus, the exhaust gas can be efficiently purified by the catalyst 50.

The sub-catalyst 50 according to the embodiment described above has the outer shape and the radial thickness W shown in FIG. 3 which do not change in the exhaust gas flowing direction EX. However, the catalyst 50 may have any configurations shown in FIGS. 8 to 13. It should be noted that the outer shape corresponds to a shape of the outer wall surface of the outermost portion of the catalyst 50 along the cross section shown in FIG. 3 and the radial thickness W corresponds to a length (a width) of the catalyst 50 radially from the central axis of the exhaust passage part 34 under the state that the catalyst 50 is disposed in the exhaust passage part 34.

The sub-catalyst 50 shown in FIG. 8 is provided in the peripheral part 34P of the exhaust passage part 34 at a position adjacent to the turbine outlet passage 44 similar to the catalyst 50 according to the embodiment described above. This catalyst 50 has a constant outer shape which does not change in the exhaust gas flowing direction EX under the state that the catalyst 50 is disposed in the exhaust passage part 34. Also, this catalyst 50 has a radial thickness W which gradually decreases downstream along the exhaust gas flowing direction EX.

The sub-catalyst 50 shown in FIG. 9 is provided in the peripheral part 34P of the exhaust passage part 34 at a position adjacent to the turbine outlet passage 44 similar to the catalyst 50 according to the embodiment described above. This catalyst 50 has a constant outer shape which does not change in the exhaust gas flowing direction EX under the state that the catalyst 50 is disposed in the exhaust passage part 34. Also, this catalyst 50 has a radial thickness W which gradually increases downstream along the exhaust gas flowing direction EX.

The sub-catalyst 50 shown in FIG. 10 is provided in the peripheral part 34P of the exhaust passage part 34 at a position adjacent to the turbine outlet passage 44 similar to the catalyst 50 according to the embodiment described above. This catalyst 50 has an outer shape which enlarges downstream along the exhaust gas flowing direction EX under the state that the catalyst 50 is disposed in the exhaust passage part 34. Also, this catalyst 50 has a radial thickness W which is constant in the exhaust gas flowing direction EX.

The sub-catalyst 50 shown in FIG. 11 is provided in the peripheral part 34P of the exhaust passage part 34 at a position adjacent to the turbine outlet passage 44 similar to the catalyst 50 according to the embodiment described above. This catalyst 50 has an outer shape which narrows downstream along the exhaust gas flowing direction EX under the state that the catalyst 50 is disposed in the exhaust passage part 34. Also, this catalyst 50 has a radial thickness W which is constant in the exhaust gas flowing direction EX.

The sub-catalyst 50 shown in FIG. 12 is provided in the peripheral part 34P of the exhaust passage part 34 at a position adjacent to the turbine outlet passage 44 similar to the catalyst 50 according to the embodiment described above. This catalyst 50 includes four sub-catalyst portions 50A to 50D. Each of the portions 50A to 50D has a constant outer shape which does not change in the exhaust gas flowing direction EX under the state that the catalyst 50 is disposed in the exhaust passage part 34. Also, each of the portions 50A to 50D has a constant radial thickness W which does not change in the exhaust gas flowing direction EX.

These sub-catalyst portions 50A to 50D are provided in the peripheral part 34P of the exhaust passage part 34 at an equal angle interval along the cross section of the exhaust passage part 34 shown in FIG. 12(B). In other words, the sub-catalyst 50 shown in FIG. 12 is provided only in a partial area of the peripheral part 34P along the cross section of the exhaust passage part 34, while the sub-catalyst 50 according to the embodiment described above is provided in the entire area of the peripheral part 34P along the cross section of the exhaust passage part 34.

The sub-catalyst 50 shown in FIG. 13 is provided in the peripheral part 34P of the exhaust passage part 34 at a position adjacent to the turbine outlet passage 44 similar to the catalyst 50 according to the embodiment described above. This catalyst 50 has a constant outer shape which does not change in the exhaust gas flowing direction EX under the state that the catalyst 50 is disposed in the exhaust passage part 34. Also, this catalyst 50 has a constant radial thickness W which does not change in the exhaust gas flowing direction EX. However, the radial thickness W changes in the circumferential direction of the catalyst 50. In other words, the catalyst 50 shown in FIG. 13 is disposed in the exhaust passage 34 under the state that the central axis of the catalyst 50 is offset from the central axis of the exhaust passage part 34.

Further, as shown in FIG. 14, the sub-catalyst 50 according to the embodiment described above may be provided such that the upstream portion of the catalyst 50 is located in the turbine outlet passage 44 and the downstream portion of the catalyst 50 is located in the exhaust passage part 34. If possible, the catalyst 50 may be provided such that the entirety of the catalyst 50 is located in the turbine outlet passage 44.

In addition, as shown in FIG. 15, the sub-catalyst 50 according to the embodiment described above may be provided in the exhaust passage part 34 at a position downstream away from the exhaust gas outlet 44O of the turbine outlet passage 44 in the exhaust gas flowing direction EX by a predetermined distance.

The exhaust passage part 34 shown in FIG. 16(B) gradually narrows downstream in the exhaust gas flowing direction EX from the downstream end portion 50DE of the sub-catalyst 50. In this case, after the exhaust gas flows into the catalyst 50 from the upstream end portion 50UE of the catalyst 50 and flows along the inner wall surface 50I of the catalyst 50 (the exhaust gas flows through the peripheral part 34P of the exhaust passage part 34), the exhaust gas does not easily flow out from the downstream end portion 50DE of the catalyst 50. Further, the flow passage resistance of the central part 34C of the exhaust passage part 34 at the area where the catalyst 50 is disposed, is smaller than that of the peripheral part 34P of the exhaust passage part 34 at the area where the catalyst 50 is disposed. Thus, as shown by an arrow 104, the exhaust gas flowing along the inner wall surface 50I of the catalyst 50 easily leaves the inner wall surface 50I of the catalyst 50 toward the central part 34C of the exhaust passage part 34.

If each carrier wall of the sub-catalyst 50 is porous, the exhaust gas flowing through the interior of the catalyst 50 easily flows into the central part 34C of the exhaust passage part 34 through the pores of the porous carrier walls.

On the other hand, as shown in FIG. 16(A), the exhaust passage part 34 according to the embodiment described above has a constant shape which does not change from the downstream end portion 50DE of the sub-catalyst 50 in the exhaust gas flowing direction EX. Thus, the exhaust gas flowing along the inner wall surface 50I of the catalyst 50 easily flows out from the downstream end portion 50DE of the catalyst 50. Therefore, the exhaust gas does not easily leave the inner wall surface 50I of the catalyst 50. Thus, as shown by an arrow 103, the exhaust gas flowing along the inner wall surface 50I of the catalyst 50 flows along the inner wall surface 50I of the catalyst 50 through the entire length of the catalyst 50 and flows out from the downstream end portion 50DE of the catalyst 50. Therefore, the catalyst 50 can be efficiently used for the exhaust gas purification.

Even if the carrier wall of the sub-catalyst 50 is porous, the exhaust gas flowing through the interior of the catalyst 50 does not easily flows out through the pores of the porous carrier wall to the central part 34C of the exhaust passage part 34. Thus, the exhaust gas flowing through the interior of the catalyst 50 flows through the entire length of the catalyst 50 and thereafter, flows out from the downstream end portion 50DE of the catalyst 50. Therefore, the catalyst 50 can be efficiently used for the exhaust gas purification.

Further, in terms of efficiently using the sub-catalyst 50 for the exhaust gas purification as described above, any of configurations shown in FIGS. 17 to 20 may be used as the configuration of the exhaust passage part 34 downstream of the catalyst 50 in the embodiment described above.

The configuration of the exhaust passage part 34 downstream of the catalyst 50 shown in FIG. 17 has a shape which gradually enlarges downstream in the exhaust gas flowing direction EX from the downstream end portion 50DE of the catalyst 50. The configuration of the exhaust passage part 34 downstream of the catalyst 50 shown in FIG. 18 has a shape which gradually enlarges downstream in the exhaust gas flowing direction EX from the portion downstream of the downstream end portion 50DE of the catalyst 50. The configuration of the exhaust passage part 34 shown in FIG. 19 has a shape which gradually enlarges downstream in the exhaust gas flowing direction EX from the portion upstream of the downstream end portion 50DE of the catalyst 50.

The configuration of the exhaust passage part 34 downstream of the sub-catalyst 50 shown in FIG. 20 has a shape which enlarges perpendicularly to the exhaust gas flowing direction EX without any gradually enlarging transition portion from the downstream end portion 50DE of the catalyst 50. Similar to the configuration shown in FIG. 18, a configuration of the exhaust passage part 34 downstream of the catalyst 50 may have a shape which enlarges perpendicularly to the exhaust gas flowing direction EX without any gradually enlarging transition portion from the portion downstream of the downstream end portion 50DE of the catalyst 50. Similar to the configuration shown in FIG. 19, a configuration of the exhaust passage part 34 may have a shape which enlarges perpendicularly to the exhaust gas flowing direction EX without any gradually enlarging transition portion from the portion upstream of the downstream end portion 50DE of the catalyst 50.

As described above, the configuration of the exhaust passage part 34 having a shape which gradually enlarges downstream in the exhaust gas flowing direction EX or enlarges perpendicularly to the exhaust gas flowing direction EX without any gradually enlarging transition portion from the portion adjacent to the downstream end portion 50DE of the catalyst 50, can be used as the configuration of the exhaust passage part 34 in the embodiment described above. Broadly, a configuration of the exhaust passage part 34 having a shape which enlarges downstream in the exhaust gas flowing direction EX from the portion adjacent to the downstream end portion 50DE of the catalyst 50, can be used as the configuration of the exhaust passage part 34.

In this case, the portion adjacent to the downstream end portion 50DE of the sub-catalyst 50 includes the portions downstream and upstream of the downstream end portion 50DE of the catalyst 50 as well as the downstream end portion 50DE itself of the catalyst 50. In addition, the shape enlarging downstream in the exhaust gas flowing direction EX includes any shape such as a shape which gradually enlarges downstream in the exhaust gas flowing direction EX or enlarges perpendicularly to the exhaust gas flowing direction EX without any gradually enlarging transition portion or enlarges downstream in the exhaust gas flowing direction EX step-by-step.

As described above, the flow passage resistance of the central part 34C of the exhaust passage part 34 at the area where the sub-catalyst 50 is disposed, is smaller than that of the peripheral part 34P of the exhaust passage part 34 at the area where the sub-catalyst 50 is disposed. Therefore, the exhaust gas flowing along the inner wall surface 50I of the catalyst 50 may leave the wall face 50I toward the central part 34C of the exhaust passage part 34. On the other hand, when the exhaust passage part 34 has a shape which enlarges downstream in the exhaust gas flowing direction EX from the portion adjacent to the downstream end portion 50DE of the catalyst 50, the exhaust gas easily flows out from the downstream end portion 50DE of the catalyst 50. Thus, the exhaust gas flowing along the inner wall surface 50I of the catalyst 50 is difficult to leave the inner wall surface 50I toward the central part 34C of the exhaust passage part 34. Therefore, the exhaust gas is likely to flow along the inner wall surface 50I of the catalyst 50 through the entire length of the catalyst 50. Thus, the catalyst 50 can be efficiently used for the exhaust gas purification.

Further, a configuration shown in FIG. 21 can be used as the configuration of the exhaust passage part 34 between the turbine outlet passage 44 and the sub-catalyst 50 in the embodiment described above. The configuration of the exhaust passage part 34 between the turbine outlet passage 44 and the catalyst 50 shown in FIG. 21, gradually enlarges downstream in the exhaust gas flowing direction EX from the outlet end portion 44O of the turbine outlet passage 44 to the upstream end portion 50UE of the catalyst 50. A configuration which gradually enlarges downstream in the exhaust gas flowing direction EX from a position downstream of the outlet end portion 44O of the turbine outlet passage 44 and upstream of the catalyst 50 to the upstream end portion 50UE of the catalyst 50, can be used as the exhaust passage part 34 between the turbine outlet passage 44 and the catalyst 50. In addition, a configuration which enlarges perpendicularly to the exhaust gas flowing direction EX without any gradually enlarging transition portion from the outlet end portion 44O of the turbine outlet passage 44 or from a position downstream of the outlet end portion 44O of the turbine outlet passage 44 and a position upstream of the catalyst 50, can be used as the exhaust passage part 34 between the turbine outlet passage 44 and the catalyst 50.

As described above, a configuration which gradually enlarges downstream in the exhaust gas flowing direction EX or enlarges perpendicularly to the exhaust gas flowing direction EX without any gradually enlarging transition portion from a position adjacent to the outlet end portion 44O of the turbine outlet passage 44, can be used as the exhaust passage part 34. Broadly, a configuration which enlarges downstream in the exhaust gas flowing direction EX from the position adjacent to the outlet end portion 44O of the turbine outlet passage 44, can be used as the exhaust passage part 34. In this case, the position adjacent to the outlet end portion 44O of the turbine outlet passage 44 includes a position downstream of the outlet end portion 44O of the turbine outlet passage 44 as well as a position corresponding to the outlet end portion 44O itself of the turbine outlet passage 44. Further, the shape enlarging downstream in the exhaust gas flowing direction EX includes a shape gradually enlarging downstream in the exhaust gas flowing direction EX or enlarging perpendicularly to the exhaust flowing direction EX without any gradually enlarging transition portion or enlarging downstream in the exhaust gas flowing direction EX step-by-step or the like.

A sub-catalyst 50 and an exhaust passage part 34 shown in FIG. 22 can be used as the sub-catalyst 50 and the exhaust passage part 34 according to the embodiment described above, respectively. The catalyst 50 shown in FIG. 2 is disposed in the exhaust passage part 34 such that the upstream end portion 50UE of the catalyst 50 exposes to (faces) the turbine outlet passage 44. On the other hand, the catalyst shown in FIG. 22 is disposed in the exhaust passage part 34 such that the upstream end portion 50UE does not expose to the turbine outlet passage 44 and the inner wall surface 50I of the catalyst 50 at the central part 34C side of the exhaust passage part 34 is flush with the inner peripheral wall surface 44I of the turbine outlet passage 44 in the exhaust gas flowing direction EX.

The exhaust gas purification system according to the embodiment uses the fact that the exhaust gas discharged from the exhaust gas discharging part 49 of the turbine wheel 45 flows and whirls through the turbine outlet passage 44 and the exhaust passage part 34 to purify the exhaust gas efficiently. Therefore, the sub-catalyst 50 is disposed at a position where the exhaust gas whirls after the exhaust gas is discharged from the exhaust gas discharging part 49 of the turbine wheel 45.

The outer shape of the sub-catalyst (the oxidation catalyst) along the cross section thereof according to the embodiment described above is generally circular. However, the present invention can be applied to an oxidation catalyst having a non-circular outer shape. In addition, the sub-catalyst 50 according to the embodiment described above is the oxidation catalyst. However, the present invention can be applied to an exhaust gas purification system provided with an exhaust gas purification apparatus such as a DPF, a NOx catalyst and a three-way catalyst as the sub-catalyst 50.

As can be understood from the above description, the engine which the exhaust gas purification system according to the embodiments described above is applied, having:

(a1) a turbocharger 40 including a turbine wheel 45 and a housing 42H for housing the turbine wheel 45, the housing 42H defining a turbine outlet passage 44 communicating with an exhaust gas discharging part 49 of the turbine wheel 45, and (a2) an exhaust passage part 34 communicating with an exhaust gas outlet 44O of the turbine outlet passage 44.

The exhaust gas purification system comprises an exhaust gas purification apparatus (the sub-catalyst 50) for purifying an exhaust gas discharged from the engine. The exhaust gas purification apparatus is disposed in (b1) the exhaust passage part 34 at a position adjacent to the exhaust gas outlet 44O of the turbine outlet passage 44 and/or (b2) the turbine outlet passage 44, Further, the exhaust gas purification apparatus includes an exhaust gas purification member (the carrier walls 51, 53 and 53R and 53C) relating to the purification of the exhaust gas.

The exhaust gas purification member is provided in the exhaust gas purification apparatus such that (c1) a density of the member located in a peripheral part 34P and/or 44P of the exhaust passage part 34 and/or the turbine outlet passage 44 is larger than that of the member located in a central part 34C and/or 44C of the exhaust passage part 34 and/or the turbine outlet passage 44 and (c2) a flow passage resistance per unit volume of the member at an area of the central part 34C and/or 44C of the exhaust passage part 34 and/or the turbine outlet passage 44 in an exhaust gas flowing direction EX is smaller than that of the member at an area of the peripheral part 34P and/or 44P of the exhaust passage part 34 and/or the turbine outlet passage 44 in the exhaust gas flowing direction EX.

Further, the exhaust gas purification apparatus has upstream and downstream end portions 50UE and 50UD. The exhaust passage part 34 enlarges from a position adjacent to the downstream end portion 50UD of the exhaust gas purification apparatus in the exhaust gas flowing direction EX.

Still further, the turbine outlet passage 44 and/or the exhaust passage part 34 extends straight coaxially with a rotation axis RA of the turbine wheel 45 from the exhaust gas discharging part 49 of the turbine wheel 45 to the exhaust gas purification apparatus.

In addition, the exhaust gas purification apparatus includes a catalyst apparatus having a carrier wall 51, 53 and 53R and 53C which corresponds to the exhaust gas purification member and a catalytic metal 52 carried on either wall surface of said carrier wall. The carrier wall of the catalyst apparatus is formed to have a hollow shape such that the carrier wall is provided only in the peripheral part 34P and/or 44P of the exhaust passage part 34 and/or the turbine outlet passage 44.

Therefore, the exhaust gas purification system according to each of the embodiments and the modified examples thereof can efficiently purify the exhaust gas by the exhaust gas purification apparatus without excessively increasing the flow passage resistance of the exhaust passage part 34 (the upstream straight part 34U) or the turbine outlet passage 44 at the area where the exhaust gas purification apparatus (the sub-catalyst 50) is disposed.

REFERENCE SIGHS LIST

34 . . . Exhaust passage part
34C . . . Central part of the exhaust passage part
34P . . . Peripheral part of the exhaust passage part
34U . . . Upstream straight part
40 . . . Turbocharger
42 . . . Turbine part of the turbocharger
42H . . . Housing of the turbine part
44 . . . Turbine outlet passage of the turbine part
44O . . . Exhaust gas outlet of the turbine outlet passage
45 . . . Turbine wheel
49 . . . Exhaust gas discharging part of the turbine part
50 . . . Oxidation catalyst (Sub-catalyst)
50DE . . . Downstream end portion of the sub-catalyst
51 . . . Carrier wall
53 . . . Carrier walls
53R, 53C . . . Carrier walls
RA . . . Rotation axis of the turbine wheel

The invention claimed is:

1. An exhaust gas purification system applied to an internal combustion engine, comprising:
 (a1) a turbocharger including a turbine wheel and a housing for housing said turbine wheel, said housing defining a turbine outlet passage communicating with an exhaust gas discharging part of said turbine wheel, and
 (a2) an exhaust passage part communicating with an exhaust gas outlet of said turbine outlet passage, wherein
 said exhaust gas purification system comprises an exhaust gas purification apparatus including an exhaust gas purification member being disposed in at least one of:
 (b1) one end of said exhaust passage part at a position adjacent to said exhaust gas outlet of said turbine outlet passage; and (b2) said turbine outlet passage, wherein said exhaust gas purification member is disposed in the exhaust gas purification apparatus such that:
  (c1) a density of said exhaust gas purification member is larger in at least one of a peripheral part of said exhaust passage part and a peripheral part of said turbine outlet passage than the density of said exhaust gas purification member in at least one of a central part of said exhaust passage part and a central part of said turbine outlet passage, and
  the density of said exhaust gas purification member located in a peripheral part of said exhaust passage part and/or said turbine outlet passage is larger than the density of said exhaust gas purification member located in the central part of said exhaust passage part and/or said turbine outlet passage; and
  (c2) a flow passage resistance per unit volume of said exhaust gas purification member in an exhaust gas flowing direction is smaller in at least one of the central part of said exhaust passage part and the central part of said turbine outlet passage than in at least one of the peripheral part of said exhaust passage part and the peripheral part of said turbine outlet passage, wherein
 said exhaust gas purification member occupies at least an outermost area of said peripheral part along a cross section of at least one of said exhaust passage part and said turbine outlet passage.

2. The exhaust gas purification system as set forth in claim 1, wherein said exhaust gas purification apparatus has upstream and downstream end portions and said exhaust passage part enlarges from a position adjacent to said downstream end portion of said exhaust gas purification apparatus in said exhaust gas flowing direction.

3. The exhaust gas purification system as set forth in claim 1, wherein said turbine outlet passage and/or said exhaust passage part extends straight coaxially with a rotation axis of said turbine wheel from said exhaust gas discharging part of said turbine wheel to said exhaust gas purification apparatus.

4. The exhaust gas purification system as set forth in claim 1, wherein said exhaust gas purification apparatus includes a catalyst apparatus having a carrier wall which corresponds to said exhaust gas purification member and a catalytic metal carried on either wall surface of said carrier wall, and said carrier wall of said catalyst apparatus is formed to have a hollow shape such that said carrier wall is provided only in said peripheral part of said exhaust passage part and/or said turbine outlet passage.

* * * * *